US007998364B2

(12) United States Patent
Xia et al.

(10) Patent No.: US 7,998,364 B2
(45) Date of Patent: Aug. 16, 2011

(54) SILICATE PHOSPHOR AND ITS MANUFACTURE METHOD AS WELL AS LIGHT-EMITTING DEVICE USING THE SAME

(75) Inventors: Wei Xia, Liaoning (CN); Jing Xu, Liaoning (CN); Guangxu Lin, Liaoning (CN); Xifeng Wang, Liaoning (CN); Zhiguo Xiao, Liaoning (CN)

(73) Assignee: Dalian Luminglight Science and Technology Co., Ltd., Dalian, Liaoning (CN)

( * ) Notice: Subject to any disclaimer, the term of this patent is extended or adjusted under 35 U.S.C. 154(b) by 715 days.

(21) Appl. No.: 11/754,432

(22) Filed: May 29, 2007

(65) Prior Publication Data

US 2008/0031797 A1    Feb. 7, 2008

(30) Foreign Application Priority Data

May 26, 2006   (CN) .......................... 2006 1 0082355

(51) Int. Cl.
*C09K 11/59* (2006.01)
*C09K 11/63* (2006.01)
*C09K 11/73* (2006.01)
*C09K 11/55* (2006.01)
*C09K 11/54* (2006.01)

(52) U.S. Cl. ..... 252/301.4 F; 252/301.4 P; 252/301.6 P; 252/301.6 R; 313/486; 313/503; 257/98

(58) Field of Classification Search ............ 252/301.4 F; 313/503, 486; 257/98
See application file for complete search history.

(56) References Cited

U.S. PATENT DOCUMENTS

| | | | |
|---|---|---|---|
| 3,505,240 A * | 4/1970 | Barry ...................... 252/301.4 R |
| 5,998,925 A | 12/1999 | Shimizu et al. | |
| 6,351,069 B1 | 2/2002 | Lowery et al. | |
| 6,555,958 B1 * | 4/2003 | Srivastava et al. ............. 313/506 |
| 6,649,946 B2 | 11/2003 | Bogner et al. | |
| 6,680,569 B2 | 1/2004 | Mueller-Mach et al. | |
| 6,939,481 B2 * | 9/2005 | Srivastava et al. ..... 252/301.4 R |
| 6,947,130 B2 * | 9/2005 | Mukai et al. ................... 356/121 |
| 6,982,045 B2 * | 1/2006 | Menkara et al. ......... 252/301.4 F |
| 6,998,771 B2 | 2/2006 | Debray et al. | |
| 7,045,826 B2 * | 5/2006 | Kim et al. ........................ 257/98 |
| 7,635,438 B2 * | 12/2009 | Tamatani et al. ....... 252/301.4 F |
| 2004/0135504 A1 | 7/2004 | Tamaki et al. | |
| 2006/0027781 A1 | 2/2006 | Dong et al. | |
| 2006/0027785 A1 * | 2/2006 | Wang et al. ............. 252/301.4 F |
| 2006/0028122 A1 | 2/2006 | Wang et al. | |
| 2006/0081814 A1 * | 4/2006 | Shida et al. ............. 252/301.4 F |
| 2006/0145123 A1 * | 7/2006 | Li et al. ................... 252/301.4 F |
| 2007/0029526 A1 * | 2/2007 | Cheng et al. ............ 252/301.4 F |

FOREIGN PATENT DOCUMENTS

| | | | |
|---|---|---|---|
| CN | 1318271 C | | 10/2001 |
| CN | 1705732 A | | 12/2003 |
| CN | 1502137 A | | 6/2004 |
| CN | 1522291 A | | 8/2004 |
| CN | 1585141 A | | 2/2005 |
| CN | 1596292 A | | 3/2005 |
| JP | 2004-176010 | * | 6/2004 |
| WO | WO 03/080763 | * | 10/2003 |
| WO | WO 2005/027231 | * | 3/2005 |
| WO | WO 2005/098972 | * | 10/2005 |

OTHER PUBLICATIONS

Lee et al; "A Search for new red and green phosphors using a computational evolutionary optimization process", Database Inspec [Online], The Institution of Electrical Engineers, Stevenage, GB, 2005, XP002581853, Database accession No. 8386924; abstract.

Fu J; "Long-lasting phosphorescence of transparent surface-crystallized glass-ceramics", Database Inspec [Online] The Institution of Electrical Engineers, Stevenage, GB, Oct. 2000, XP002581854, Database accession No. 6792286 abstract.

Jiang Hongyi et al; "Preparation of silicate long afterglow photoluminescent materials by high temperature solid-state reaction", Database Inspec [Online], The Institution of Electrical Engineers, Stevenage, GB, 2006, XP002581855 Database accession No. 9326134, abstract.

Kee-Sun Sohn, et al; "Genetic algorithm-assisted combinatorial search for new red phosphors of high efficiency at soft ultraviolet excitation", Database Inspec [Online] The Institution of Electrical Engineers, Stevenage, GB; Dec. 2004, XP002581856, Database accession No. 8185163, abstract; compound Eu0.14Mg0.18Ca0.07Ba0,12B0.17Si0.320.

Jiuhui Gan, et al; "Luminescence properties of Eu<2+>-activated Sr5(P04)2(Si04) for green-emitting phosphor", Database Inspec [Online] The Institution of Electrical Engineers, Stevenage, GB; Oct. 15, 2009, XP002581857, Database accession No. 10887789 abstract.

R. El Ouenzerfi, et al; "Luminescent properties of rare-earth ($Eu^{3+}$, $EU^{2+}$ and $Ce^{3+}$) doped apatitic oxyphosphosilicates", Journal of Luminescence, Amsterdam, NL LNKD-DOI:10.1016/S0022-2313(02)00580-X, vol. 102-103, May 1, 2003, pp. 426-433, XP004416566, ISSN: 0022-2313, p. 426, left-hand column, figures 1,6; compound Ca5La5(Si04)3(P04)302:Eu, figure 6.

R. El Ouenzerfi, et al; "Relationships between structural and luminescence properties in $Eu^{3+}$-doped oxyphosphate-silicate apatite $Ca_{2+x}La_{8-31-x}(SiO_4)_{6-x}(PO_4)_xO_2$", Optical Materials, Elsevier Science Publishers B.V. Amsterdam, NL 0LNKD-DOI:10.1016/S0925-3467(00)00090-2, vol. 16, No. 1-2, Feb. 1, 2001, pp. 301-310, XP004322342, ISSN: 0925-3467, figure 3, p. 301-p. 302.

European Search Report: EP 07 72 1210.

* cited by examiner

*Primary Examiner* — C. Melissa Koslow
(74) *Attorney, Agent, or Firm* — Ladas & Parry LLP

(57) ABSTRACT

The invention relates to an ultraviolet to green light region silicate phosphor capable of being excited by radiation light source and its manufacturing method, particularly to white and multicolor systems light-emitting device. The material has luminous color in the range from blue to red color system. The essential composition of the phosphor is aMO.bM'O.SiO$_2$.cR:xEu.yLn.zLv.δLm, wherein M is an element or a combination of elements selected from the group consisting of Sr, Ca, Ba and Zn; M' is an element or a combination of elements selected from the group consisting of Mg, Cd and Be; R is one or two of B$_2$O$_3$ and P$_2$O$_5$; Ln is an element or a combination of elements selected from the group consisting of Nd, Dy, Ho, Tm, La, Ce, Er, Pr, Bi, Sm, Sn, Y, Lu, Ga, Sb, Tb, Mn and Pb; Lv is an element or a combination of elements selected from the group consisting of Cl, F, Br, I and S; Lm is an element or a combination of elements selected from the group consisting of Li, Na and K.

12 Claims, 9 Drawing Sheets

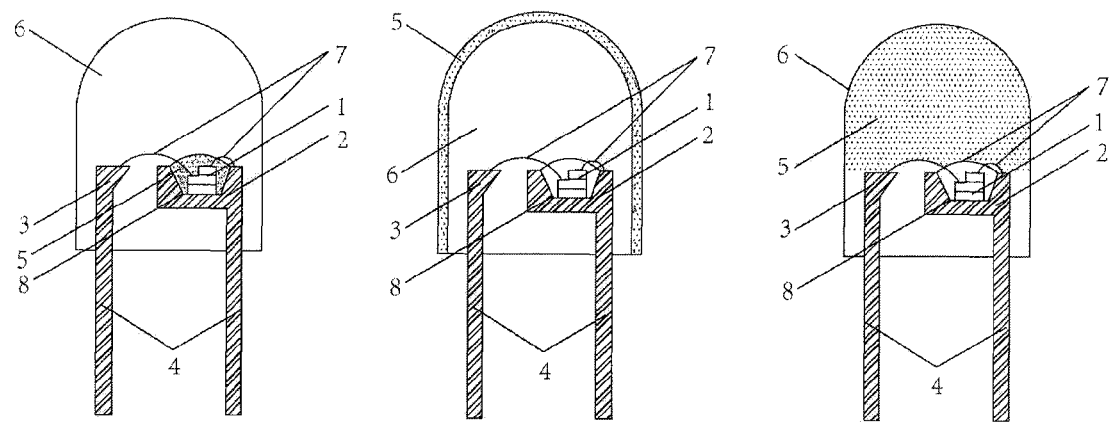
Fig.13a  Fig.13b  Fig.13c
FIG. 13
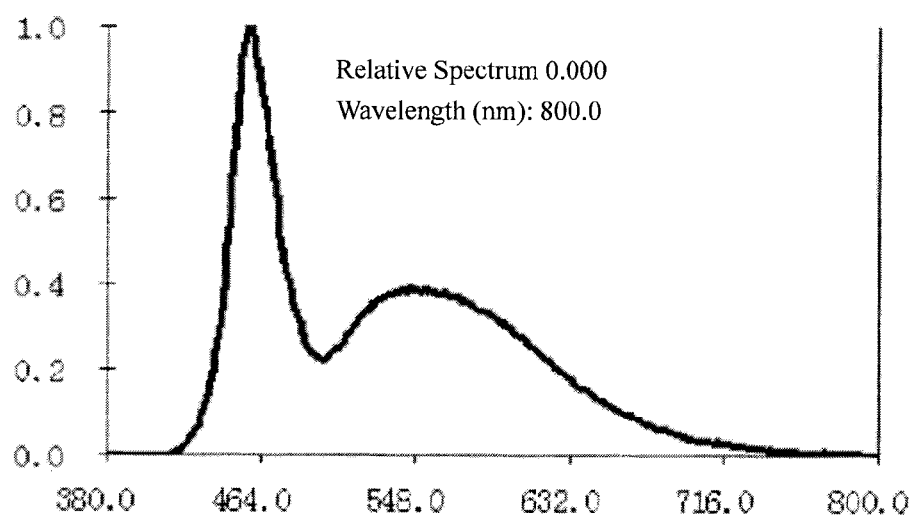
FIG. 14

SILICATE PHOSPHOR AND ITS MANUFACTURE METHOD AS WELL AS LIGHT-EMITTING DEVICE USING THE SAME

TECHNICAL FIELD

The invention relates to a phosphor, particularly to a phosphor used for a white and multicolor system light-emitting device using semiconductor light-emitting element (LED), which is capable of being excited by a light-emitting element as an radiation light source with an emission spectrum at 240-510 nm which is of ultraviolet to green light region, absorbing at least a portion of emission light of radiation light source and giving out an emission spectrum between 420-700 nm which has at least one peak value in the range of 430-630 nm. The present invention belongs to optical electron and illumination technical field.

BACKGROUND ART

With the breakthrough of the third generation of semiconductor material gallium nitride and the birth of blue, green and white light-emitting diode, LED (Light-Emitting Diode), which is praised as "a technique lighting the future", gradually comes into our daily life, and will lead us to a brighter future. Using the third generation of semiconductor material gallium nitride as a semiconductor lighting source, the electric power consumption is only $\frac{1}{10}$ of incandescent lamp under the same brightness, and the service life can reach 80,000 hours or more. A semiconductor lamp can use 50 years or more under normal circumstance. As a novel lighting technique, LED will initiate a revolution in lighting field due to its advantages of versatile application, environmental friendly and convenient adjustment. The emergence of white light LED is a substantial step LED strides from marking function to lighting function. White light LED is closest to sunlight and can reflect the real color of radiated object more precisely. Seen from technical point of view, white light LED is undoubtedly the most top-edge technique of LED. The application market of white light LED will be very broad. Therefore, it is needed for a high efficiency phosphor capable of effectively converting the light from ultraviolet light to green light emitted by a light-emitting element including LED into visible light, so as to achieve white light system and multicolor system lighting device.

At present, in prior art field, white light LED is achieved mainly by a method of exciting phosphor by using ultraviolet chip or blue light chip. However, the method is always limited by the limitation of phosphors.

For example, the patents U.S. Pat. Nos. 5,998,925, 6,998,771 and ZL00801494.9 all use blue light chip to excite cerium activated rare-earth garnet phosphor (e.g., $Y_3Al_5O_{12}$:Ce, $(Y, Gd)_3(Al, Ga)_5O_{12}$:Ce, YAG for short; or Tb-garnet, TAG for short), wherein the phosphors are excited by blue light chip to emit yellow light which is blended with part of the blue light from blue light chip into white light. In this process, the used phosphors are confined greatly with respect to the application and performance of white light LED. First, the excitation of this phosphor is within the range of 420-490 nm, the most effective excitation is within the range of 450-470 nm, it is not excited within ultraviolet light region and the short wavelength side region of visible light as well as green light region; second, the emission spectrum of the phosphor of the rare-earth garnet structure can only reach at most about 540 nm, lacking red component, and thereby resulting in lower color rendering index of white light LED.

For example, the patents U.S. Pat. No. 6,649,946, US 20040135504, CN1522291A, CN1705732A, CN1596292A, CN1596478A, and U.S. Pat. No. 6,680,569A relate to rare-earth activated nitride or oxynitride phosphor capable of being effectively excited in UV-blue light region. The effective excitation wavelength range of the phosphor of this process is somewhat increased, and the emission range can also be from green light to red light, but the luminescent brightness of the phosphor is low, moreover, their production cost is high. Hence, the phosphors are confined greatly as practical LED fluorescent powder.

For example, U.S. Pat. No. 6,351,069 concerns sulfide phosphors in red color. The phosphor can be added to white light LED as a complementary color component to compensate color rending index and reduce color temperature. However, sulfide phosphors are low in luminescent brightness, although they improve color rendering index, they also reduce the lumen efficiency of LED; further, they are poor in chemical stability and aging characteristics, and corrode chips, shortening the service life of LED.

For example, US 20060027781, US 20060028122 and US 20060027785 relate to silicate phosphor, but the materials are confined within the structure of barium-containing metasilicates. Moreover, their excitation spectrum are within the range of 280-490 nm, emission spectrum within the range of 460-590 nm, and have a luminescence only in the range from green color to yellow color, also lacking red light. Further, the phosphors are poor in luminescent intensity and cannot match YAG phosphor.

For example, CN1585141A relates to halosilicate phosphor in green color and disilicate and metasilicate phosphor in red color. The phosphor in green color described in the patent is broad with respect to excitation spectrum, but unitary in luminescent color; moreover, said phosphor in red color are poor in luminescent intensity and cannot match the fluorescent powder in the prior art, and hence are confined greatly in practical application.

SUMMARY OF THE INVENTION

One object of the invention is to provide a silicate phosphor having broad excitation range (240-510 nm), broad emission range (430-630 nm), high optical conversion efficiency, and excellent aging properties; another object of the invention is to provide a method for preparing the silicate phosphor; and yet another object of the invention is to provide a light-emitting device comprising the silicate phosphor described in the invention, particularly relating to white light LED.

The essential chemical composition of the silicate phosphor of the invention is expressed with formula (1):

$$aMO.bM'O.SiO_2.cR{:}xEu.yLn.zLv.\delta Lm, \quad (1)$$

wherein
M is an element or a combination of elements selected from the group consisting of Sr, Ca, Ba and Zn;
M' is an element or a combination of elements selected from the group consisting of Mg, Cd and Be;
R is one or two of $B_2O_3$ and $P_2O_5$;
Ln is an element or a combination of elements selected from the group consisting of Nd, Dy, Ho, Tm, La, Ce, Er, Pr, Bi, Sm, Sn, Y, Lu, Ga, Sb, Tb, Mn and Pb;
Lv is an element or a combination of elements selected from the group consisting of Cl, F, Br, I and S;
Lm is an element or a combination of elements selected from the group consisting of Li, Na and K; and a, b, c, x, y, z and δ are molar coefficients, wherein $0.5 \leq a \leq 5.0$, $0 \leq b \leq 3.0$, $0 \leq c \leq 0.5$, $0.001 \leq x \leq 0.2$, $0 \leq y \leq 0.5$, $0 \leq z < 0.5$; $0 \leq \delta < 0.2$, wherein $1 < (a+b) \leq 6$, and when $(a+b) = 2$, then M'≠Mg;

the material is capable of being excited by a light-emitting element as an radiation light source having an emission spectrum between 240 and 510 nm which is from ultraviolet to green light region, absorbing at least a portion of emission light of the radiation light source, and emitting an emission spectrum between 420-700 nm which has at least one peak value in the range of 430-630 nm, the luminescence color is blue, blue-green, green, yellow-green, yellow, yellow-red, red, or white.

The silicate phosphor according to a preferred embodiment of the present invention, wherein in order to obtain a luminescence in blue color, when $1 < (a+b) < 2$, and a>b, then $0.5 \leq a \leq 1.5$, $0.4 \leq b \leq 1.0$, $0 \leq c \leq 0.5$, $0.001 \leq x \leq 0.2$, $0 \leq y \leq 0.5$, $0 \leq z < 0.5$; $0 \leq \delta < 0.2$, and M≠Ca; when $2 < (a+b) \leq 4$, and a≦b, then $1.0 \leq a \leq 2.0$, $1.0 \leq b \leq 2.0$, $0 \leq c \leq 0.5$, $0.001 \leq x \leq 0.2$, $0 \leq y \leq 0.5$, $0 \leq z < 0.5$; $0 \leq \delta < 0.2$; the wavelength of emission main peak varies with composition in the range of 440-475 nm.

The silicate phosphor according to a preferred embodiment of the present invention, wherein in order to obtain a luminescence in blue-green color, when $1 < (a+b) < 2$, and a>b, then $0.5 \leq a \leq 1.5$, $0.4 \leq b \leq 1.0$, $0 \leq c \leq 0.5$, $0.001 \leq x \leq 0.2$, $0 \leq y \leq 0.5$, $0 \leq z < 0.5$; $0 \leq \delta < 0.2$, and the molar content ratio of Ca to of Sr is between 0.2 and 0.5; when $2 < (a+b) \leq 4$, then $1.0 \leq a \leq 3.0$, $0.5 \leq b \leq 1.5$, $0 \leq c \leq 0.5$, $0.001 \leq x \leq 0.2$, $0 \leq y \leq 0.5$, $0 \leq z < 0.5$; $0 \leq \delta < 0.2$, and M≠Ba; the wavelength of emission main peak varies with composition in the range of 470-490 nm.

The silicate phosphor according to a preferred embodiment of the present invention, wherein in order to obtain a luminescence in green color, when $1 < (a+b) < 2$, then $0.5 \leq a \leq 1.5$, $0.2 \leq b \leq 1.0$, $0 \leq c \leq 0.5$, $0.001 \leq x \leq 0.2$, $0 \leq y \leq 0.5$, $0 \leq z < 0.5$; $0 \leq \delta < 0.2$, and the molar content ratio of Ca to Sr is between 0.6 and 1.5; when $2 < (a+b) \leq 5$, then $0.5 \leq a \leq 3.0$, $0 \leq b \leq 3.0$, $0 \leq c \leq 0.5$, $0.001 \leq x \leq 0.2$, $0 \leq y \leq 0.5$, $0 \leq z < 0.5$; $0 \leq \delta < 0.2$, and the molar content of Ba is greater than the molar content of Sr and/or Ca; and the luminescence color is green after excitation, the wavelength of emission main peak varies with composition in the range of 490-510 nm.

The silicate phosphor according to a preferred embodiment of the present invention, wherein in order to obtain a luminescence in yellow-green color, when $1 < (a+b) < 2$, then $0.5 \leq a \leq 1.5$, $0 \leq b \leq 1.0$, $0 \leq c \leq 0.5$, $0.001 \leq x \leq 0.2$, $0 \leq y \leq 0.5$, $0 \leq z < 0.5$, $0 \leq \delta < 0.2$, and the molar content ratio of Ca to Sr is between 2.8 and 3.3; when $2 < (a+b) \leq 6$, and a≧b, then $1.5 \leq a \leq 3.0$, $0 \leq b \leq 3.0$, $0 \leq c \leq 0.5$, $0.001 \leq x \leq 0.2$, $0 \leq y \leq 0.5$, $0 \leq z < 0.5$, $0 \leq \delta < 0.2$; when $(a+b) = 2$, then $1 \leq a \leq 2.0$, $0 \leq b \leq 1.0$, $0 \leq c \leq 0.5$, $0.001 \leq x \leq 0.2$, $0 \leq y \leq 0.5$, $0 \leq z < 0.5$, $0 \leq \delta < 0.2$, and when b≠0, then M'≠Mg; when b=0, then the molar content ratio of Sr to Ba is between 0.8 and 1.6; and the luminescence color is yellow-green after excitation, the wavelength of emission main peak varies with composition in the range of 505-525 nm.

The silicate phosphor according to a preferred embodiment of the present invention, wherein in order to obtain a luminescence in yellow color, when $1 < (a+b) < 2$, then $0.5 \leq a \leq 1.5$, $0.4 \leq b \leq 1.0$, $0 \leq c \leq 0.5$, $0.001 \leq x \leq 0.2$, $0 \leq y \leq 0.5$, $0 \leq z < 0.5$, $0 \leq \delta < 0.2$, and M≠Sr; when $2 < (a+b) \leq 6$, and a≧b, then $2 \leq a \leq 4$, $0 \leq b \leq 3.0$, $0 \leq c \leq 0.5$, $0.001 \leq x \leq 0.2$, $0 \leq y \leq 0.5$, $0 \leq z < 0.5$, $0 \leq \delta < 0.2$; when $(a+b) = 2$, then $1 \leq a \leq 2$, $0 \leq b \leq 1.0$, $0 \leq c \leq 0.5$, $0.001 \leq x \leq 0.2$, $0 \leq y \leq 0.5$, $0 \leq z < 0.5$, $0 \leq \delta < 0.2$; and when b≠0, then M'≠Mg, when b=0, then the molar content ratio of Ba is less than or equal to the molar content of Sr and/or Ca; and the luminescence color is yellow after excitation, the wavelength of emission main peak varies with composition in the range of 515-540 nm.

The silicate phosphor according to a preferred embodiment of the present invention, wherein in order to obtain a luminescence in yellow-red color, when $2 < (a+b) \leq 5$, and a>b, then $1.0 \leq a \leq 4.0$, $0 \leq b \leq 1.5$, $0 \leq c \leq 0.5$, $0.001 \leq x \leq 0.2$, $0 \leq y \leq 0.5$, $0 \leq z < 0.5$, $0 \leq \delta < 0.2$, and when b≠0, then the ratio of a to b is greater than 2, when b=0, then the molar content ratio of Sr and/or Ca to Ba is greater than 2; when $(a+b) = 2$, then $1.0 \leq a \leq 2$, $0 \leq b \leq 1.0$, $0 \leq c \leq 0.5$, $0.001 \leq x \leq 0.2$, $0 \leq y \leq 0.5$, $0 \leq z < 0.5$, $0 \leq \delta < 0.2$, and when b≠0, then M'≠Mg, when b=0, then the molar content ratio of Ba is less than the molar content of Sr and/or Ca; the luminescence color is yellow-red after excitation; and the luminescence color is yellow-red excitation, the wavelength of emission main peak varies with composition in the range of 535-580 nm.

The silicate phosphor according to a preferred embodiment of the present invention, wherein in order to obtain a luminescence in red color, when $1 < (a+b) \leq 1.5$, then $0.2 \leq a \leq 1.2$, then $0.2 \leq b \leq 1.2$, $0 \leq c \leq 0.5$, $0.001 \leq x \leq 0.2$, $0 \leq y \leq 0.5$, $0 \leq z < 0.5$, $0 \leq \delta < 0.2$; when $1.5 < (a+b) < 2$, then $0.5 \leq a \leq 1.8$, $0 \leq b \leq 1.8$, $0 \leq c \leq 0.5$, $0.001 \leq x \leq 0.2$, $0 \leq y \leq 0.5$, $0 \leq z < 0.5$, $0 \leq \delta < 0.2$; when $2 < (a+b) \leq 5$, then $1.0 \leq a \leq 3.0$, $0 \leq b \leq 3$, $0 \leq c \leq 0.5$, $0.001 \leq x \leq 0.2$, $0 \leq y \leq 0.5$, $0 \leq z < 0.5$, $0 \leq \delta < 0.2$; and the luminescence color is red after excitation, the wavelength of emission main peak varies with composition in the range of 580-630 nm.

The silicate phosphor according to a preferred embodiment of the present invention, wherein said silicate phosphor is excited by a light of radiation light source having emission peak between 240 and 510 nm, and the wavelength of the emission peak of the phosphor is longer than the wavelength of long-wave side emission peak of the radiation light source.

In the invention, the broad wavelengths of the excitation peak and emission peak of phosphor are achieved by precisely adjusting the content of and the combination of alkaline earth metal M and/or M' of silicate phosphor. The transition characteristics between energy levels of rare earth ions are dependent substantially on crystalline structures. The absorption or emission wavelength of rare earth ions is regulated by using this relationship to form a luminescence in different colors. Particularly, a wavelength with an excitation zone of 450-510 nm is the wavelength range exciting phosphor of semiconductor chip suitable for white light LED illumination. In the invention, the crystalline field environment of the Eu and Ln ions in the crystals are made to change, thus it is achieved that the emission wavelength can be regulated precisely in the region from ultraviolet to red light.

Besides, the concentration change of Eu ion affects the shift of the main peak of emission light of phosphor. The main peak value of emission of phosphor can be precisely regulated by adjusting the concentration ratios of Eu and Ln ions.

In the invention, the purpose of introducing Ln is: by utilizing energy transfer between rare earth ions, that is, after a luminescent center is excited, excitation energy can be transferred from a place of luminous body to another place thereof, or from a luminescent center to another luminescent center, so as to obtain a phosphor with high luminance.

The introduction of R can reduce synthesis temperature of matrix, promote the dispersion and phase formation of material particles in phosphor, which allows activators easily to enter matrix to form luminescent center and trap center to promote the matrix to form micro crystals; the introduction of Lv can substantially broaden the excitation spectrum range of the phosphor, enhance the adaptability of excitation wave band of the phosphor, particularly can promote significantly the increase of the intensity of phosphor $Eu^{2+}$ in near-red emission band; the introduction of Lm allows $Eu^{2+}$ to produce larger difference in the lattice environment of different matrixes by using the feature that the ionic radius of alkali metals is remarkably less than the ionic radius of alkaline earth metals. When $Eu^{2+}$ substituting alkali metal ions enters lattice, the distance between the $Eu^{2+}$ and $O^{2-}$ is less than that between $Eu^{2+}$ and $O_2^-$ in alkaline earth matrix, which renders 5d energy level of $Eu^{2+}$ increased, that is, the difference between the lower limit of 5d energy level of $Eu^{2+}$ and its base state energy increases, thereby enhancing the luminescent intensity of phosphor.

In the manufacture of the silicate phosphor according to the present invention, the raw materials used are the compounds of various elements in the formula (1). In the raw materials usually used, the compounds of the elements represented by M, M', Ln, Lm and Eu are carbonates, sulfates, nitrates, phosphates, borates, acetates, oxalates, citrates of the elements represented thereby or their oxides, hydroxides, halides; the compounds of the elements represented by Lv are halides, oxyhalogen acid salt, sulfides, oxysulfide, sulfates; the compounds of the elements represented by Si are $SiO_2$, silicic acid, silica gel, silicates or silicon nitride; the compounds of the elements represented by R are the compounds of boron and phosphorus; the molar ratios of elements in the used raw materials are:

| | |
|---|---|
| M: | 0.5-5; |
| M': | 0-3.0; |
| Si: | 1.0; |
| R: | 0-2.0; |
| Eu: | 0.001-0.2; |
| Ln: | 0-0.5; |
| Lv: | 0-0.5; |
| Lm: | 0-0.2; | wherein:
M represents one or more elements of Sr, Ca, Ba and Zn;
M' represents one or more elements of Mg, Cd and Be;
R represents one or two elements of B and P;
Si represents Si;
Eu represents Eu;
Ln represents one or more elements of Nd, Dy, Ho, Tm, La, Ce, Er, Pr, Bi, Sm, Sn, Y, Lu, Ga, Sb, Tb, Mn and Pb;
Lv represents one or more elements of Cl, F, Br, I and S.

Its manufacture process comprises a high temperature solid-state reaction method. The raw material of each element is weighed based on its molar ratio and mixed, the mixture is sintered in oxidizing atmosphere at a temperature between 700 and 1100° C. for 2-6 hours, and then sintered in reducing atmosphere (reducing atmosphere are hydrogen, ammonia, nitrogen and hydrogen, or in the presence of carbon particles, or additionally comprising not more than 10% $H_2S$) at a temperature between 1000 and 1300° C. for 2-6 hours.

In order to improve the quality of material, optionally, a small amount (no more than 30 wt % of raw material) of other compounds, such as, $NH_4Cl$, $NH_4F$, $(NH_4)_2HPO_4$, glucose, urea, $BaF_2$, $CaF_2$, $ZnF_2$, ZnS, SrS, CaS, $SrSO_4$, $SrHPO_4$ or $CaHPO_4$, $Li_2CO_3$, $KNO_3$, $Na_2CO_3$ is added into the raw materials to participate in the solid-state reaction. After sintering, the sintered mixture is cooled, pulverized, and sieved into particle materials of various levels depending on application requirements.

The present invention also relates to a light-emitting device having a light-emitting element as an radiation light source and a phosphor capable of converting at least a portion of light of radiation light source, characterized in that:
the radiation light source is configured to emit radiation having a peak wavelength ranging in the range of ultraviolet to green light region between 240 and 510 nm, and the phosphor allows at least a part of the wavelength of the first luminescent spectrum of said light-emitting element to be converted into a second emission spectrum having at least one peak in the range of 430 to 630 nm, wherein at least one or more of the phosphor are the silicate phosphor according to the present invention.

The light-emitting device according to a preferred embodiment of the present invention, the light-emitting element as radiation light source at least has one or more emission peak wavelengths in the range from ultraviolet to green light region of 240-510 nm where the phosphor absorbs luminescent element.

The light-emitting device according to a preferred embodiment of the present invention, the luminescent layer of the light-emitting element is a nitride semiconductor or a nitride semiconductor comprising In.

The light-emitting device according to a preferred embodiment of the present invention, the phosphor used is any one of silicate phosphor according to the present invention.

The light-emitting device according to a preferred embodiment of the present invention, the light-emitting element as radiation light source has a peak value of emission spectrum in the range of ultraviolet light, the phosphor used is one of or a combination of two of the silicate phosphor according to the present invention; the phosphor absorbs at least a portion of emission light of radiation light source and/or other phosphor in the combination to convert at least a part of the wave length of the luminescent spectrum of the light-emitting element into different emission spectrums having at least one peak wavelength in the range between 430 and 630 nm to obtain a mixed white light, or blue light, or blue-green light, or green light, or yellow-green light, or yellow light, or yellow-red light, or red light.

The light-emitting device according to a preferred embodiment of the present invention, the light-emitting element as radiation light source has a peak value of emission spectrum in the range from blue light to green light, the phosphor used is one of or a combination of two of the silicate phosphor according to the present invention; the phosphor absorbs at least a portion of emission light of radiation light source and/or other florescent powder in the combination, and converts at least a part of the wave length of the luminescent spectrum of the light-emitting element into different emission spectra having at least one peak emission wavelength within the range between 430 and 630 nm to obtain a mixed white light, or blue light, or blue-green light, or green light, or yellow-green light, or yellow light, or yellow-red light, or red light.

The light-emitting device according to a preferred embodiment of the present invention, the phosphor used further comprises a second phosphor and/or a third phosphor, and/or a fourth phosphor, which are used together with one or more of the silicate phosphor according to the present invention; the second phosphor, and/or the third phosphor, and/or the fourth phosphor converts at least a portion of the wavelength of the light from radiation light source, and/or at least a portion of the wave length of the light from the silicate phosphor according to the present invention and has an emission spectrum having at least one emission peak wavelength in the visible light region from blue light to red light.

The light-emitting device according to a preferred embodiment of the present invention, the light-emitting element as radiation light source has a peak value of emission spectrum in the range of ultraviolet light, at least two kinds of light, including at least a portion of light from the silicate phosphor according to the present invention and the light from the second phosphor and/or the third phosphor and/or the fourth phosphor, are mixed to obtain a white light, or blue light, or blue-green light, or green light, or yellow-green light, or yellow light, or yellow-red light, or red light.

The light-emitting device according to a preferred embodiment of the present invention, the light-emitting element as radiation light source has a peak value of emission spectrum in the range from blue light to green light, at least two kinds of lights, including at least a portion of light from the radiation light source, at least a portion of light from the silicate phosphor according to the present invention, and the light from the second phosphor and/or the third phosphor and/or the fourth phosphor, are mixed to obtain a white light, or blue light, or blue-green light, or green light, or yellow-green light, or yellow light, or yellow-red light, or red light.

The light-emitting device according to a preferred embodiment of the present invention, wherein the second phosphor and/or the third phosphor and/or the fourth phosphor are: oxynitride phosphors activated by doping rare earth elements, and/or nitride phosphors activated by doping rare earth elements, and/or halosilicate phosphors activated by doping rare earth elements, and/or garnet structure phosphors activated by doping rare earth elements, and/or sulfide phosphors activated by doping rare earth elements, and/or oxide phosphors activated by doping rare earth elements, and/or oxysulfide phosphors activated by doping rare earth elements, and/or aluminate phosphors activated by doping rare earth elements, and/or magnesium fluoroarsenate (germanate) phosphors activated by doping Mn, and/or borate phosphors activated by doping rare earth elements, and/or phosphate phosphors activated by doping rare earth elements, and/or halophosphate phosphors activated by doping rare earth elements, and/or titanate phosphors activated by doping rare earth elements, and/or thiogallate phosphors activated by doping rare earth elements.

The light-emitting device according to a preferred embodiment of the present invention, wherein the second phosphor and/or the third phosphor and/or the fourth phosphor convert the wave length of a portion of the light from radiation light source, and/or at least a portion of the wave length of the light from the silicate phosphor according to the present invention, and have an emission spectrum having at least one emission peak in the visible light region from blue light to red light.

The light-emitting device according to a preferred embodiment of the present invention, the light-emitting device is a luminescent conversion LED in which the phosphor directly or indirectly contacts with the chip.

The light-emitting device according to a preferred embodiment of the present invention, the light-emitting device is a lighting device comprising at least one LED using phosphors.

The excitation spectrum and emission spectrum of the phosphors according to the invention were tested using F-4500 fluorescent spectrometer.

The relative spectrum power distribution and chromaticity coordinate of LED were tested using PMS-50 ultraviolet-visible-near-infrared spectrum analytic system.

BRIEF DESCRIPTION OF THE FIGURES

FIG. 13 a schematic figure showing three kinds packaging manner of LED, in which FIG. 13a shows a manner that the phosphor directly contacts with the semiconductor luminescent chip, FIG. 13b shows a manner that the phosphor indirectly contacts with the semiconductor luminescent chip, and FIG. 13c shows a manner that the phosphor indirectly contacts with the semiconductor luminescent chip.

FIG. 14 a diagram of the relative spectrum power distribution of white light LED of Example 46;

EMBODIMENTS OF THE INVENTION

Now, the examples of the present invention will be described. It is to be noted that this invention is not limited by these examples.

EXAMPLE 1

| Raw material | Weight(g) |
|---|---|
| $SrCO_3$ | 147.63 |
| MgO | 24.19 |
| $SiO_2$ | 60.09 |
| $(NH_4)_2HPO_4$ | 5.28 |
| $Eu_2O_3$ | 5.28 |
| $NH_4Cl$ | 13.375 |

The raw materials of the above composition were ball-milled and mixed homogenously, then placed in a crucible and put into an electric furnace, subsequently sintered in oxidizing atmosphere at 900° C. for 4 hours, after cooling, the sintered product was sintered in a furnace through which a mixture gas consisting of 95% hydrogen, 3% nitrogen and 2% hydrogen sulfide was passed, and kept at 1100° C. for 4 hours for sintering. After the sintered product was cooled, it was pulverized, and ground by ball-milling, and then the phosphor having blue luminescence color according to the present invention $SrO \cdot 0.6MgO \cdot SiO_2 \cdot 0.02P_2O_5 : 0.03Eu^{2+} \cdot 0.25Cl^-$ was collected with a 325 mesh sieve. The material had an excitation spectrum in the range of 240-450 nm, with an excitation main peak value at 358 nm, and an emission spectrum in the range of 420-560 nm, with an emission main peak value at 467 nm.

EXAMPLES 2-8

The phosphor with blue luminescence color of Examples 2-8 were prepared by the raw materials mixing method and sintering method as in Example 1, the phosphor had an excitation spectrum in the range of 240-450 nm (the excitation main peak position varied with composition in the range of 350-410 nm) and an emission spectrum in the range of 420-560 nm (the emission main peak value varied with composition in the range of 440-475 nm). The compositions of Examples 2-8 were listed in Table 1.

For the composition of the phosphor having blue luminescence color according to the invention, the law for the effect of the composition variation on the change of emission wavelength was:

When $1<(a+b)<2$, $M \neq Ca$, and Ba partially replaced for Sr, the excitation emission wave length of the fluorescent powder moved toward the direction of long wave with the increase of Ba content, and the excitation emission wave length of the fluorescent powder moved toward the direction of short wave with the increase of Sr content, and the larger the ratio of the coefficient a to b (a>b), the more significant the excitation emission wavelength moved toward the direction of short wave.

When $2<(a+b)\leqq4$, the excitation emission wave length was affected by the ratio of Ba to Sr content and the ratio of a to b. The excitation emission wave length moved in the direction of short wave with the increase of Ba content; and the excitation emission wave length moved in the direction of long wave with the increase of the ratio of a to b.

Figure 1:
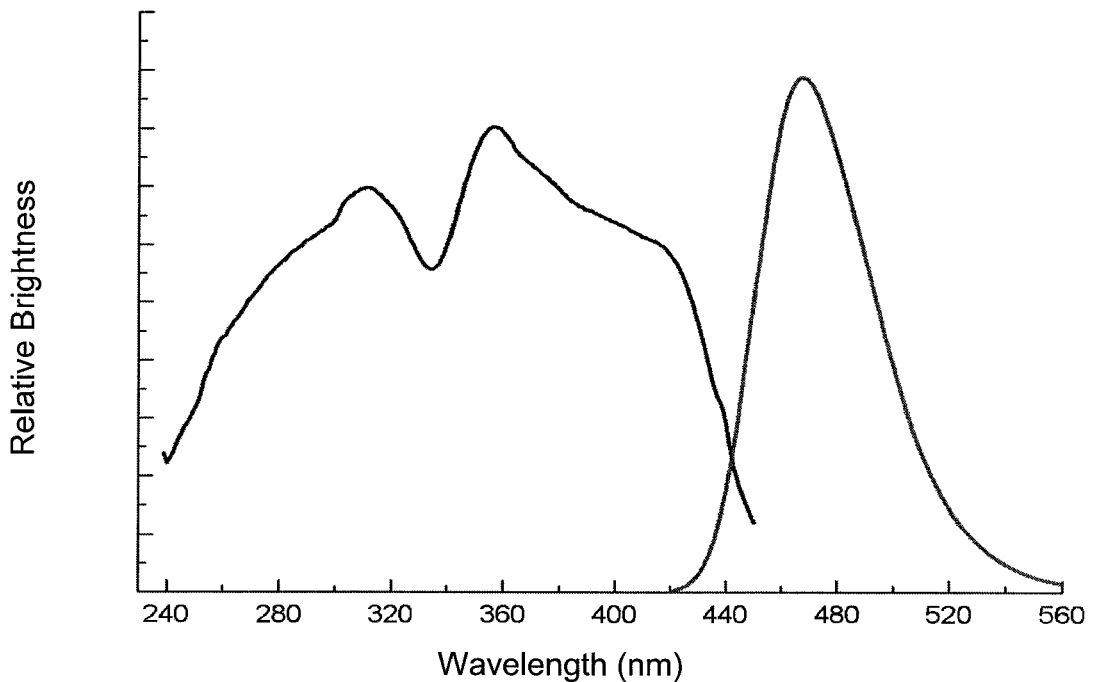
FIG. 1 the excitation and emission spectra of the phosphor of Example 1 having blue luminescence color.

FIG. 1 shows the excitation emission spectrum of the phosphor of Example 1. It can be seen from FIG. 1 that the phosphor having blue luminescence color according to the present invention had broad excitation spectrum range and had effective excitation in long wave UV to blue purple light spectrum region. The effective excitation range thereof was quite broader than the excitation range of the phosphor having blue luminescence in the prior art, moreover and had high luminescent efficiency. Thus, the phosphor according to the present invention was very suitable for preparing LED using ultraviolet chip or purple light chip as light-emitting element of radiation light source.

EXAMPLE 9

| Raw material | Weight(g) |
|---|---|
| $SrCO_3$ | 88.58 |
| $CaCO_3$ | 20.02 |
| MgO | 20.16 |
| $SiO_2$ | 60.09 |
| $H_3BO_3$ | 2.47 |
| $(NH_4)_2HPO_4$ | 52.82 |
| $Eu_2O_3$ | 1.76 |

TABLE 1

| Example No. | Composition of Examples |
|---|---|
| 2 | $1.3SrO \cdot 0.4MgO \cdot SiO_2 \cdot 0.08B_2O_3 : 0.003Eu^{2+} \cdot 0.05Tm^{3+} \cdot 0.005Cl^-$ |
| 3 | $0.8SrO \cdot 0.5MgO \cdot SiO_2 \cdot 0.01B_2O_3 : 0.02Eu^{2+} \cdot 0.001Ce^{3+} \cdot 0.05F^-$ |
| 4 | $SrO \cdot 0.9MgO \cdot SiO_2 \cdot 0.02B_2O_3 : 0.1Eu^{2+} \cdot 0.002Tm^{3+} \cdot 0.2K^+$ |
| 5 | $SrO \cdot 0.5BaO \cdot 1.0MgO \cdot SiO_2 \cdot 0.2B_2O_3 : 0.001Eu^{2+} \cdot 0.0001I^-$ |
| 6 | $0.6SrO \cdot 0.4BaO \cdot 0.05CaO \cdot 1.2MgO \cdot SiO_2 \cdot 0.5B_2O_3 : 0.2Eu^{2+} \cdot 0.001S \cdot 0.1Na^+$ |
| 7 | $SrO \cdot BaO \cdot 2.0MgO \cdot SiO_2 \cdot 0.02B_2O_3 : 0.003Eu^{2+} \cdot 0.45Cl^-$ |
| 8 | $0.5SrO \cdot 2.0BaO \cdot 1.0MgO \cdot SiO_2 \cdot 0.02B_2O_3 : 0.05Eu^{2+} \cdot 0.45Br^-$ |

The raw materials of the above composition were ball-milled and mixed homogenously, then placed in a crucible and put into an electric furnace, subsequently sintered in oxidizing atmosphere at 800° C. for 6 hours, after cooling, the sintered product was sintered in a furnace through which hydrogen gas was passed, and kept at 1300° C. for 4 hours for sintering. After the sintered product was cooled, it was pulverized, and ground by ball-milling, and then the phosphor having a blue-green luminescence color according to the present invention $0.6SrO \cdot 0.2CaO \cdot 0.5MgO \cdot SiO_2 \cdot 0.02B_2O_3 \cdot 0.2P_2O_5:0.01Eu^{2+}$ was collected with a 325 mesh sieve. The material had an excitation spectrum in the range of 250-470 nm, with an excitation main peak value at 362 nm, and an emission spectrum in the range of 420-590 nm, with an emission main peak value at 485 nm.

EXAMPLES 10-14

The phosphor with blue-green luminescence color of Examples 10-14 were prepared by the raw materials mixing method and sintering method as in Example 9, the phosphor had an excitation spectrum in the range of 250-470 nm (the excitation main peak value varied with composition in the range of 360-420 nm) and an emission spectrum in the range of 420-590 nm (the emission main peak value varied with composition in the range of 470-490 nm). The compositions of Examples 10-14 were listed in Table 2.

TABLE 2

| Example No. | Composition of Examples |
|---|---|
| 10 | $0.7SrO \cdot 0.3CaO \cdot 0.4MgO \cdot SiO_2 \cdot 0.008B_2O_3:0.005Eu^{2+} \cdot 0.005Mn^{2+} \cdot 0.005Cl^-$ |
| 11 | $0.7SrO \cdot 0.2BaO \cdot 0.2CaO \cdot 0.6MgO \cdot SiO_2 \cdot 0.01B_2O_3:0.03Eu^{2+} \cdot 0.001Ho^{3+} \cdot 0.05F^- \cdot 0.15Li^+$ |
| 12 | $SrO \cdot 0.2CaO \cdot 0.7MgO \cdot SiO_2 0.02P_2O_5:0.02Eu^{2+} \cdot 0.002Nd^{3+}$ |
| 13 | $SrO \cdot 2.2CaO \cdot 0.5MgO \cdot SiO_2:0.02Eu^{2+} \cdot 0.005Ce^{3+}$ |
| 14 | $3.0CaO \cdot 1.5MgO \cdot SiO_2:0.14Eu^{2+}$ |

For the composition of the phosphor having blue-green luminescence color according to the invention, the law for the effect of the composition variation on the change of emission wavelength was:

When $1<(a+b)<2$, under the condition that the ratio of the molar content of Ca element to the molar content of Sr element was between 0.2 and 0.5, when Ba and/or Ca partially replaced for Sr, the excitation emission wave length of the fluorescent powder moved in the direction of long wave with the increase of Ba and/or Ca content.

When $2<(a+b)\leq4$, $M \neq Ba$, the excitation emission wave length was affected by the ratio of Ca to Sr content and the ratio of a to b. The excitation emission wave length moved in the direction of long wave with the increase of Ca content; and the excitation emission wave length moved in the direction of long wave with the increase of the ratio of a to b.

Figure 2:
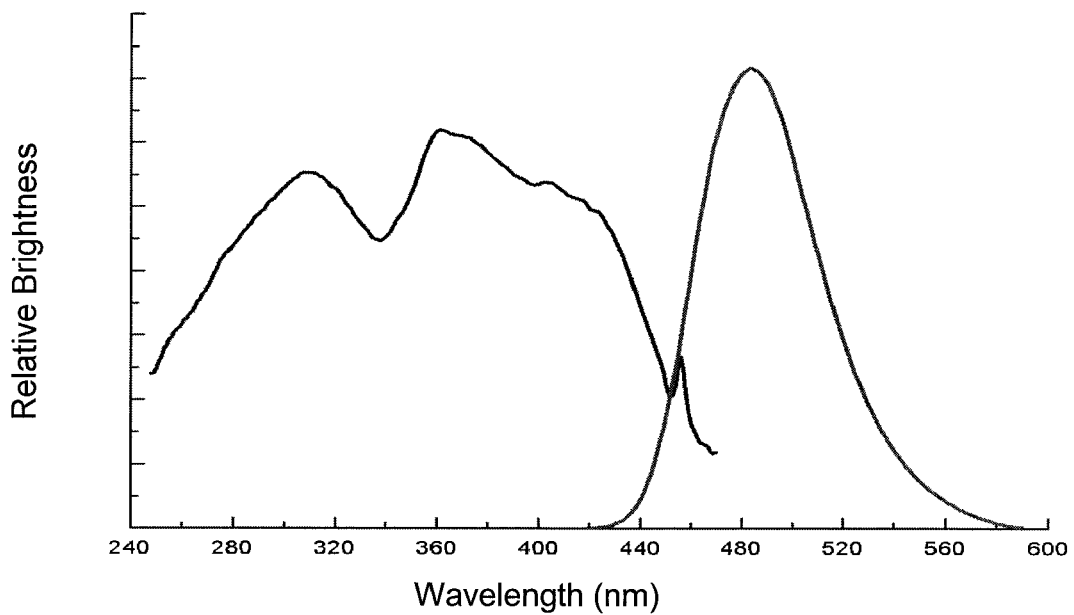
FIG. 2 the excitation and emission spectra of the phosphor of Example 9 having blue-green luminescence color.

FIG. 2 shows the excitation emission spectrum of the phosphor of Example 9. It can be seen from FIG. 2 that the phosphor having blue-green luminescence color according to the present invention had effective excitation in the excitation spectrum range from long wave UV to blue light spectrum region, and can be suitable for preparing LED using ultraviolet chip or purple light chip or blue chip as light-emitting element of radiation light source.

EXAMPLE 15

| Raw material | Weight(g) |
|---|---|
| $SrCO_3$ | 73.82 |
| $CaCO_3$ | 50.05 |
| MgO | 12.09 |
| $SiO_2$ | 60.09 |
| $H_3BO_3$ | 1.24 |
| $Eu_2O_3$ | 1.76 |
| $Mn_3O_4$ | 0.076 |

The raw materials of the above composition were ball-milled and mixed homogenously, then placed in a crucible and put into an electric furnace, subsequently sintered in oxidizing atmosphere at 1000° C. or 2 hours, after cooling, the sintered product was sintered in a furnace through which hydrogen gas was passed, and kept at 1000° C. for 6 hours for sintering. After the sintered product was cooled, it was pulverized, and ground by ball-milling, and then the phosphor having a green luminescence color according to the present invention $0.5SrO \cdot 0.5CaO \cdot 0.3MgO \cdot SiO_2 \cdot 0.01B_2O_3:0.01Eu^{2+} \cdot 0.001Mn^{2+}$ was collected with a 325 mesh sieve. The material had an excitation spectrum in the range of 260-480 nm, with an excitation main peak value at 422 nm, and an emission spectrum in the range of 430-600 nm, with an emission main peak value at 499 nm.

EXAMPLES 16-19

The phosphor with green luminescence color of Examples 16-19 were prepared by the raw materials mixing method and sintering method as in Example 15, the phosphor had an excitation spectrum in the range of 260-480 nm (the excitation main peak value varied with composition in the range of 370-430 nm) and an emission spectrum in the range of 430-600 nm (the emission main peak value varied with composition in the range of 490-510 nm). The compositions of Examples 16-19 were listed in Table 3.

TABLE 3

| Example No. | Composition of Examples |
| --- | --- |
| 16 | $0.4SrO \cdot 0.4CaO \cdot 0.5 MgO \cdot SiO_2 \cdot 0.008B_2O_3:0.03Eu^{2+} \cdot 0.005Tb^{3+} \cdot 0.05Cl^-$ |
| 17 | $0.4SrO \cdot 0.6CaO \cdot 0.2 MgO \cdot SiO_2:0.06Eu^{2+} \cdot 0.001Sm^{2+} \cdot 0.0075F^-$ |
| 18 | $2.0BaO \cdot 2.08MgO \cdot SiO_2 \cdot 0.002P_2O_5:0.06Eu^{2+} \cdot 0.3Mn^{2+} \cdot 0.2La^{3+} \cdot 0.45Cl^-$ |
| 19 | $0.5SrO \cdot 0.1 CaO \cdot 2.0BaO \cdot 1.0MgO \cdot SiO_2 \cdot 0.001B_2O_3:0.03Eu^{2+} \cdot 0.0005I^- \cdot 0.0001Li^+$ |

For the composition of the phosphor having green luminescence color according to the invention, the law for the effect of the composition variation on the change of emission wave length was:

When 1<(a+b)<2, under the condition that the ratio of the molar content of Ca element to the molar content of Sr element was between 0.6 and 1.5, the excitation emission wave length of the fluorescent powder moved in the direction of long wave with the increase of Ca content.

When 2<(a+b)≦5, the excitation emission wave length was affected by the ratio of Ba to Sr content. The excitation emission wave length moved in the direction of short wave with the increase of Ba content; and the excitation emission wave length moved in the direction of long wave with the increase of Sr content.

Figure 3:
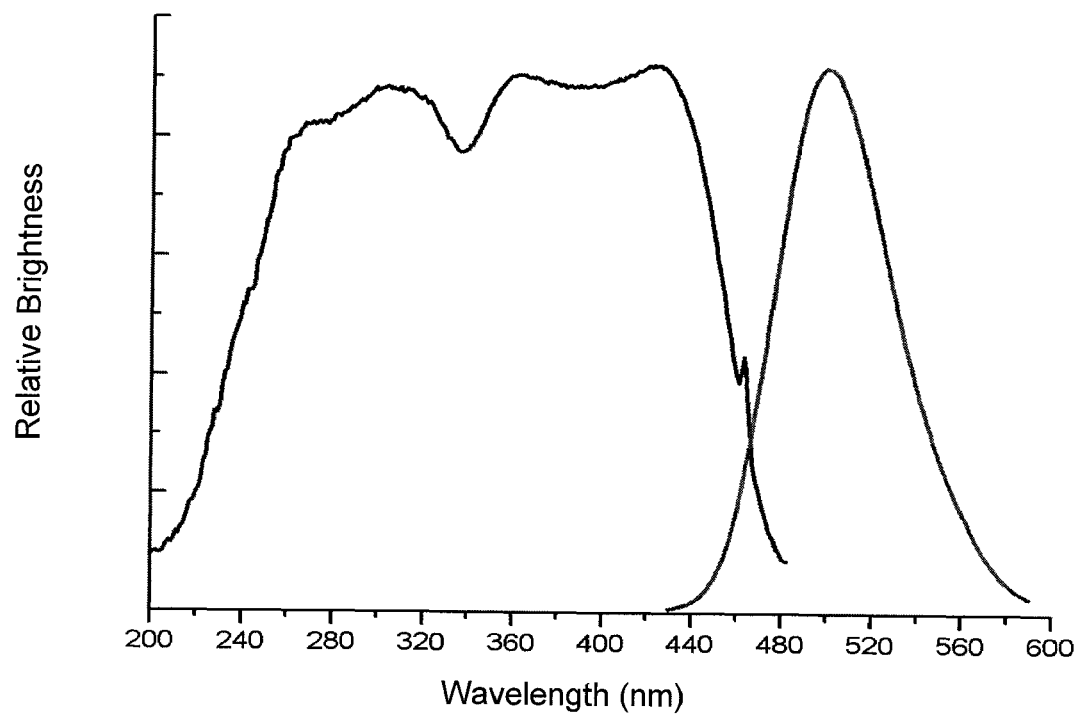
FIG. 3 the excitation and emission spectra of the phosphor of Example 13 having green luminescence color.

FIG. 3 shows the excitation emission spectrum of the phosphor of Example 15. It can be seen from FIG. 3 that the phosphor having green luminescence color according to the present invention had effective excitation in the excitation spectrum range from long wave UV to blue-green light spectrum region, and can be suitable for preparing LED using ultraviolet chip or purple light chip or blue chip as light-emitting element of radiation light source.

EXAMPLE 20

| Raw material | Weight(g) |
| --- | --- |
| $SrCO_3$ | 29.53 |
| $CaCO_3$ | 60.05 |
| MgO | 16.12 |
| $SiO_2$ | 60.09 |
| $H_3BO_3$ | 1.24 |
| $Eu_2O_3$ | 3.52 |
| $CeO_2$ | 0.172 |
| $NH_4F$ | 0.22 |

The raw materials of the above composition were ball-milled and mixed thoroughly, then placed in a crucible and put into an electric furnace, subsequently sintered in oxidizing atmosphere at 1000° C. for 3 hours, after cooling, the sintered product was sintered in a furnace through which a mixture gas consisting of nitrogen and hydrogen was passed, and kept at 1300° C. for 2 hours for sintering. After the sintered product was cooled, it was pulverized, and ground by ball-milling, and then the phosphor having a yellow-green luminescence color according to the present invention $0.2SrO \cdot 0.6CaO \cdot 0.4MgO \cdot SiO_2 \cdot 0.02B_2O_3:0.02Eu^{2+} \cdot 0.001Ce^{3+}. 0.006F^-$ was collected with a 325 mesh sieve. The material had an excitation spectrum in the range of 240-500 nm, with an excitation main peak value at 430 nm, and an emission spectrum in the range of 450-600 nm, with an emission main peak value at 512 nm.

EXAMPLES 21-25

The phosphor with yellow-green luminescence color of Examples 21-25 were prepared by the raw materials mixing method and sintering method as in Example 20, the phosphor had an excitation spectrum in the range of 240-510 nm (the excitation main peak value varied with composition in the range of 370-440 nm) and an emission spectrum in the range of 450-600 nm (the emission main peak value varied with composition in the range of 505-525 nm). The compositions of Examples 21-25 were listed in Table 4.

TABLE 4

| Example No. | Composition of Examples |
| --- | --- |
| 21 | $0.3SrO \cdot 0.95CaO \cdot 0.7MgO \cdot SiO_2 \cdot 0.003P_2O_5:0.13Eu^{2+} \cdot 0.005Dy^{3+} \cdot 0.005I^-$ |
| 22 | $0.36SrO \cdot 1.05CaO \cdot 0.2MgO \cdot SiO_2:0.06Eu^{2+} \cdot 0.001Sn^{2+} \cdot 0.0005S^-$ |
| 23 | $SrO \cdot BaO \cdot SiO_2 \cdot 0.01B_2O_3 \cdot 0.008P_2O_5:0.06Eu^{2+} \cdot 0.05F^-$ |
| 24 | $2.0BaO \cdot 2MgO \cdot SiO_2:0.025Eu^{2+} \cdot 0.5Cl^-$ |
| 25 | $0.25SrO \cdot 1.5BaO \cdot 0.25CaO \cdot 2MgO \cdot SiO_2:0.16Eu^{2+} \cdot 0.01Mn^{2+} \cdot 0.01Ce^{3+} \cdot 0.075F^-$ |

For the composition of the phosphor having yellow-green luminescence color according to the invention, the law for the effect of the composition variation on the change of emission wave length was:

When 1<(a+b)<2, under the condition that the ratio of the molar content of Ca element to the molar content of Sr element was between 2.8 and 3.3, the excitation emission wave length of the phosphor moved in the direction of long wave with the increase of Ca content.

When 2<(a+b)≦6, and a≧b, the excitation emission wave length was affected by the ratio of Ba to Sr content and the ratio of a to b. The excitation emission wave length moved in the direction of long wave with the increase of Ba and Ca content; and the excitation emission wave length moved more remarkably in the direction of short wave with the increase of the ratio of a to b (a>b).

Figure 4:
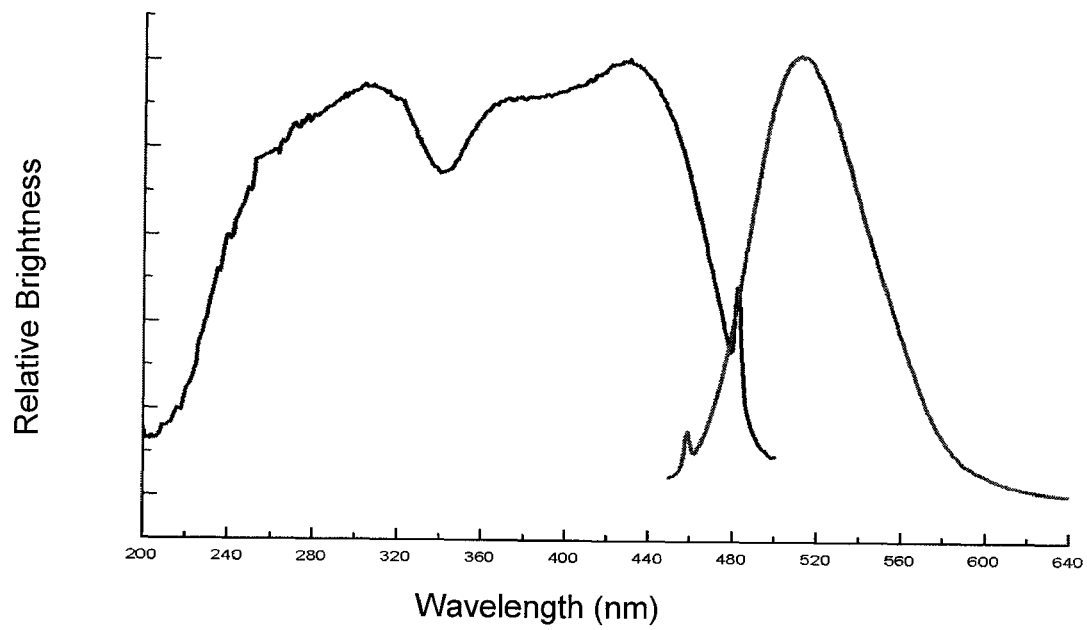
FIG. 4 the excitation and emission spectra of the phosphor of Example 17 having yellow-green luminescence color.
Figure 5:
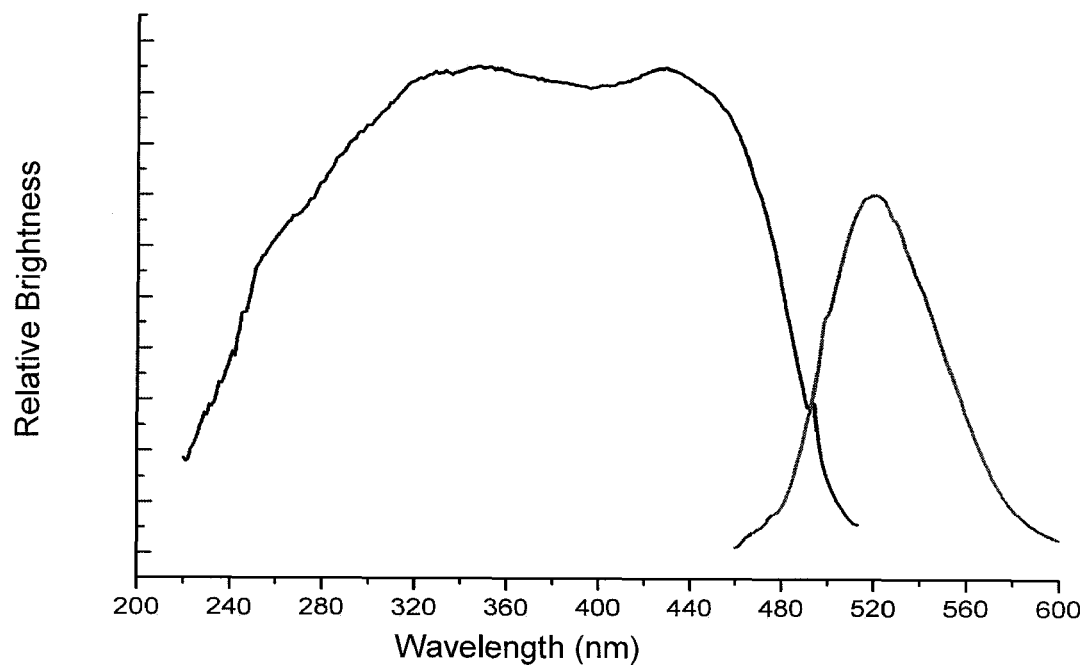
FIG. 5 the excitation and emission spectra of the phosphor of Example 20 having yellow-green luminescence color, wherein the emission spectrum was obtained by using 470 nm radiation light source as testing wavelength.
Figure 6:
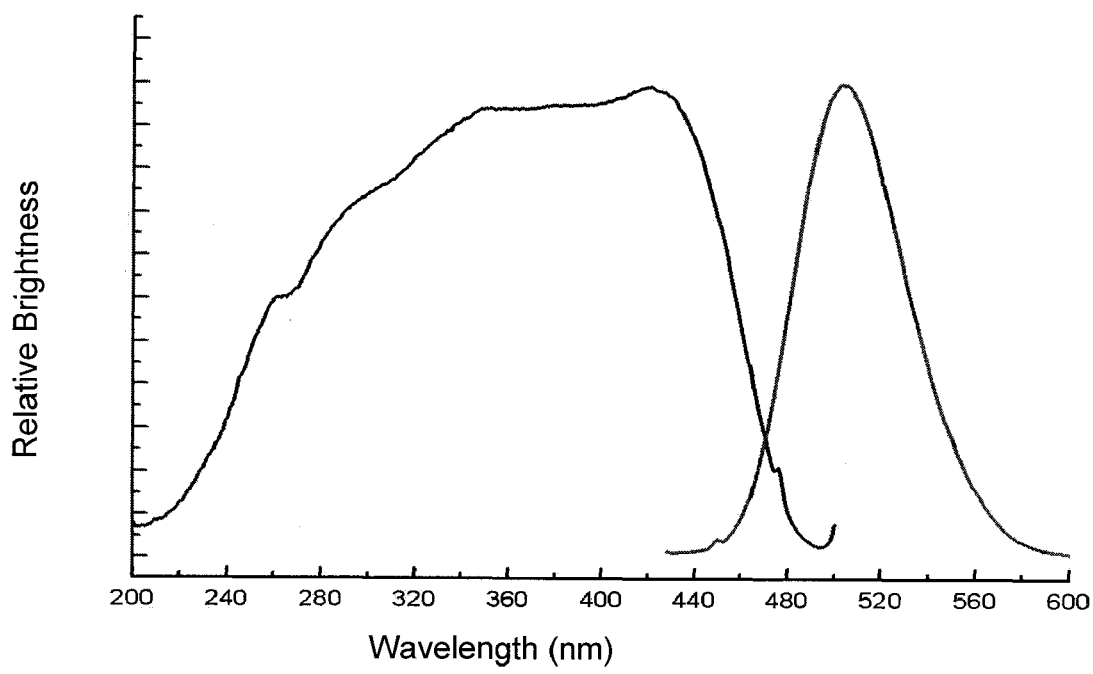
FIG. 6 the excitation and emission spectra of the phosphor of Example 21 having yellow-green luminescence color.
Figure 7:
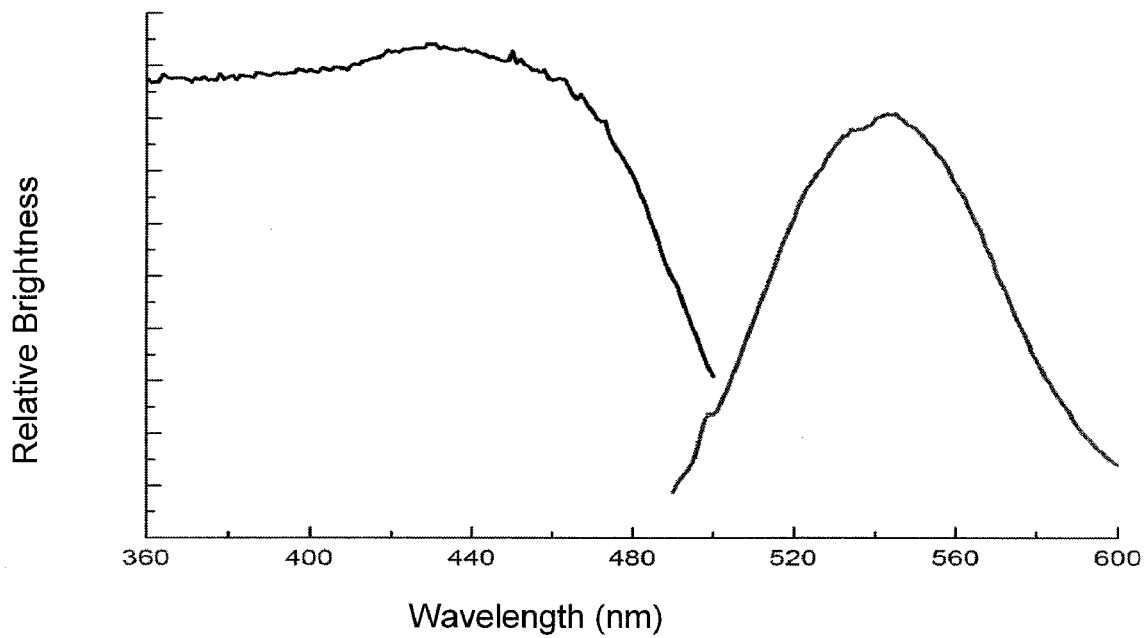
FIG. 7 the excitation and emission spectra of the phosphor of Example 26 having yellow luminescence color.
Figure 8:
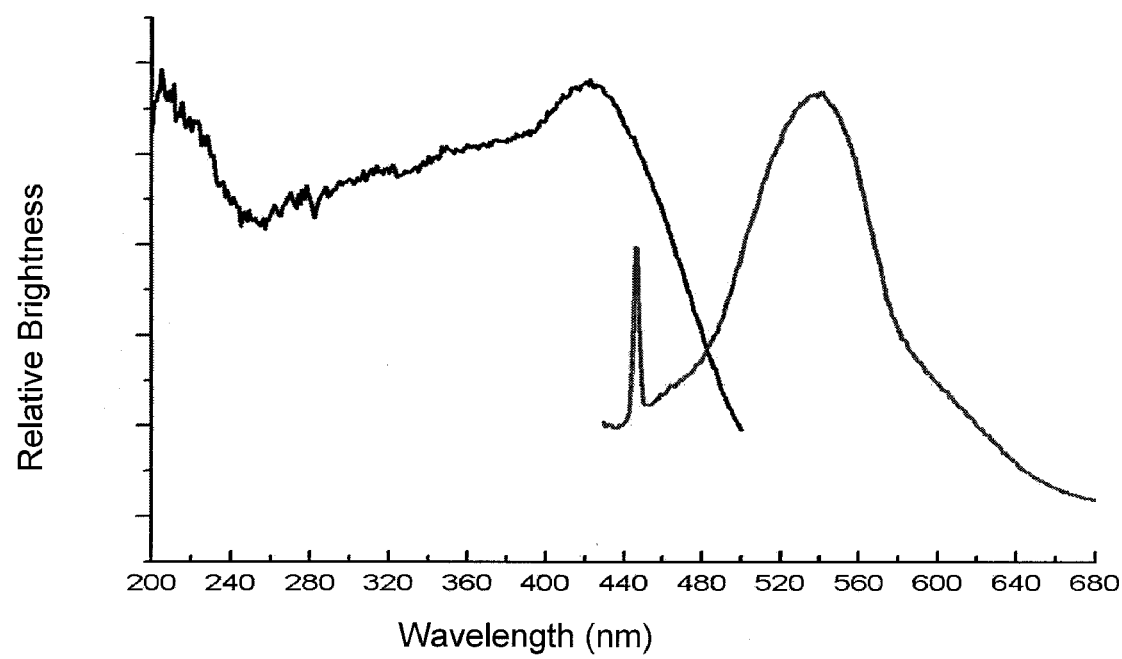
FIG. 8 the excitation and emission spectra of the phosphor of Example 28 having yellow luminescence color.
Figure 9:
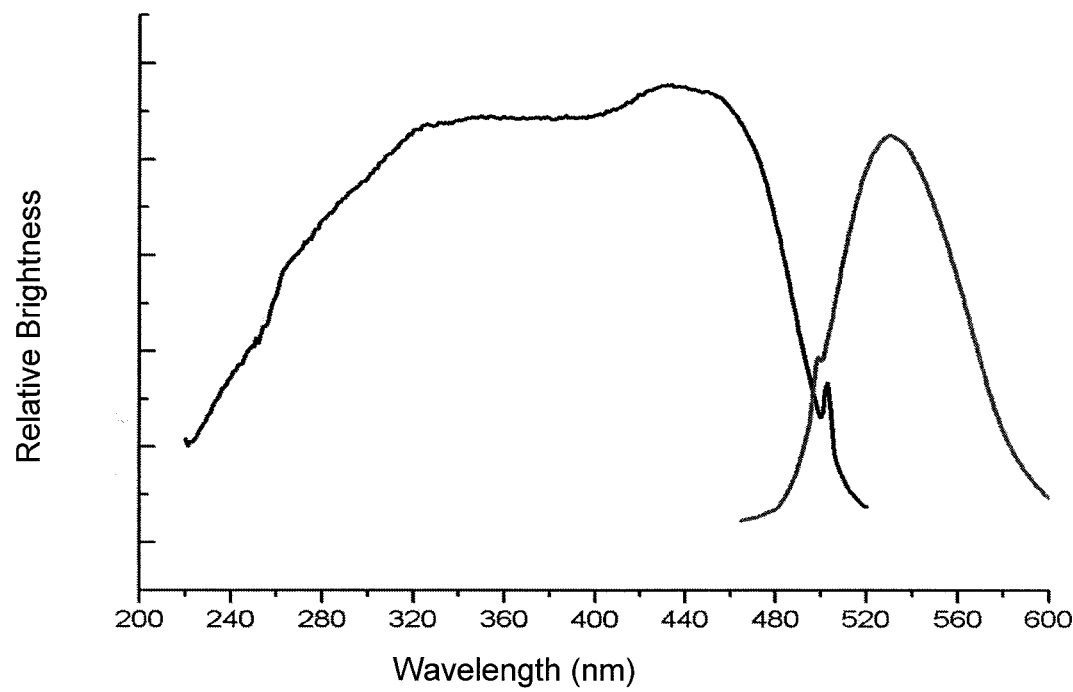
FIG. 9 the excitation and emission spectra of the phosphor of Example 31 having yellow luminescence color, wherein the emission spectrum was obtained by using 470 nm radiation light source as testing wavelength.
Figure 10:
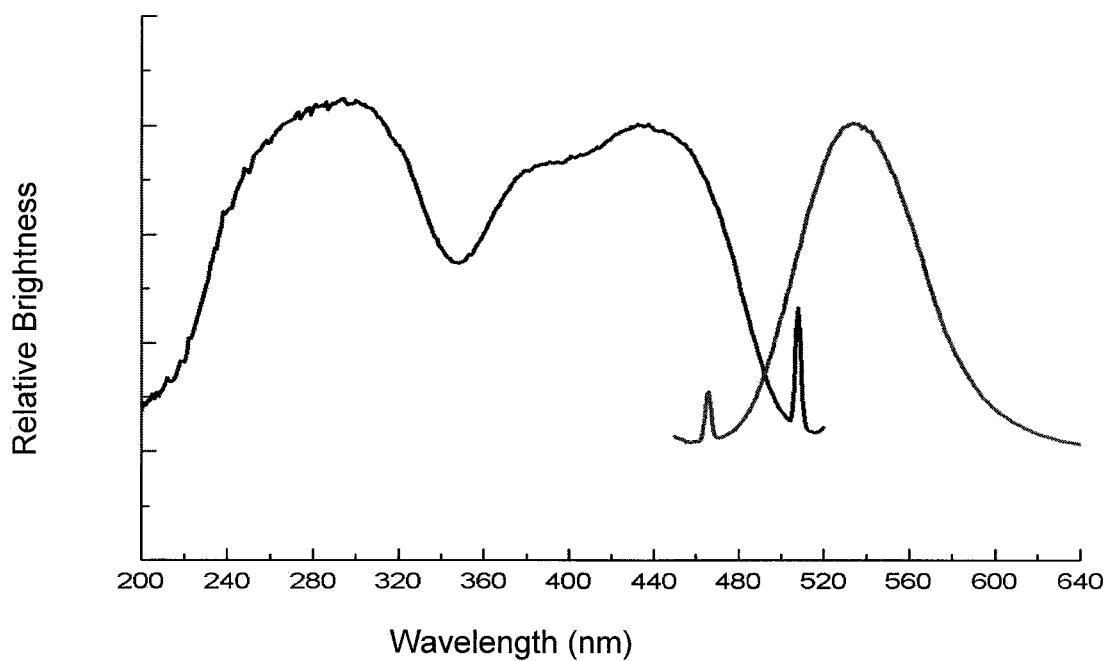
FIG. 10 the excitation and emission spectra of the phosphor of Example 32 having yellow luminescence color.

FIGS. 4, 5 and 6 show the excitation emission spectra of the phosphor of Examples 20, 23 and 24, respectively. The emission spectrum of FIG. 5 was obtained using the radiation light source of 470 nm as testing wave length. It can be seen by analyzing the spectrum diagram that the phosphor having yellow-green luminescence color according to the present invention had effective excitation in the excitation spectrum range from long wave UV to blue-green light spectrum region, and can be suitable for preparing LED using ultraviolet chip or purple light chip or blue chip as light-emitting element of radiation light source.

EXAMPLE 26

| Raw material | Weight(g) |
|---|---|
| $SrCO_3$ | 214.06 |
| $BaCO_3$ | 124.32 |
| $SiO_2$ | 60.09 |
| $Eu_2O_3$ | 35.19 |
| $CaF_2$ | 4.68 |
| $NH_4Cl$ | 2.67 |
| $Li_2CO_3$ | 1.85 |

The raw materials of the above composition were ball-milled and mixed homogenously, then placed in a crucible and put into an electric furnace, subsequently sintered in oxidizing atmosphere at 1000° C. for 4 hours, after cooling, the sintered product was sintered in a furnace through which a mixture gas consisting of nitrogen and hydrogen at a volume ratio of 97:3 was passed, and kept at 1230° C. for 6 hours for sintering. After the sintered product was cooled, it was pulverized, and ground by ball-milling, and then the phosphor having a yellow luminescence color according to the present invention $1.45SrO \cdot 0.63BaO \cdot 0.06CaO \cdot SiO_2 : 0.1Eu^{2+} \cdot 0.05Cl^- \cdot 0.12F^- \cdot 0.05Li^+$ was collected with a 325 mesh sieve. The material had an excitation spectrum in the range of 240-520 nm, with an excitation main peak value at 430 nm, and an emission spectrum in the range of 450-630 nm, with an emission main peak value at 543 nm.

EXAMPLES 27-32

The phosphor with yellow luminescence color of Examples 27-32 were prepared by the raw materials mixing method and sintering method as in Example 26, the phosphor had an excitation spectrum in the range of 240-520 nm (the excitation main peak value varied with composition in the range of 400-470 nm) and an emission spectrum in the range of 450-640 nm (the emission main peak value varied with composition in the range of 515-540 nm). The compositions of Examples 27-32 were listed in Table 5.

TABLE 5

| Example No. | Composition of Examples |
|---|---|
| 27 | $CaO \cdot 0.15BaO \cdot 0.6MgO \cdot SiO_2 \cdot 0.05P_2O_5 : 0.03Eu^{2+}$ |
| 28 | $1.3SrO \cdot 0.6CaO \cdot 0.5BaO \cdot 0.4MgO \cdot SiO_2 \cdot 0.002B_2O_3 \cdot 0.005P_2O_5 : 0.2Eu^{2+} \cdot 0.028Mn^{2+} \cdot 0.035Dy^{3+} \cdot 0.3Cl^-$ |
| 29 | $0.25SrO \cdot 0.25CaO \cdot 1.5BaO \cdot 2.0MgO \cdot SiO_2 : 0.14Eu^{2+} \cdot 0.078Mn^{2+} \cdot 0.035Bi^{3+} \cdot 0.08Cl^-$ |
| 30 | $0.25SrO \cdot 0.25CaO \cdot 1.5BaO \cdot 2.0MgO \cdot SiO_2 : 0.14Eu^{2+} \cdot 0.078Mn^{2+} \cdot 0.035Ce^{3+}$ |
| 31 | $1.3SrO \cdot 0.7BaO \cdot SiO_2 \cdot 0.01B_2O_3 \cdot 0.0076P_2O_5 : 0.023Eu^{2+} \cdot 0.05F^- \cdot 0.01Li^+$ |
| 32 | $0.85CaO \cdot 0.55MgO \cdot SiO_2 \cdot 0.02B_2O_3 : 0.015Eu^{2+} \cdot 0.0013Ce^{3+} \cdot 0.006F^- \cdot 0.4Cl^-$ |

For the composition of the phosphor having yellow luminescence color according to the invention, the law for the effect of the composition variation on the change of emission wave length was:

When $1<(a+b)<2$, under the condition of M≠Sr, the excitation emission wave length of the fluorescent powder moved in the direction of long wave with the increase of Ca content.

When $2 \leq (a+b) \leq 6$, and $a \geq b$, the excitation emission wave length was affected by the ratio of Ba, Sr and Ca content and the ratio of a to b. The excitation emission wave length moved in the direction of short wave with the increase of Ba content; the excitation emission wave length moved in the direction of long wave with the increase of Sr content; and the excitation emission wave length moved in the direction of long wave with the increase of Ca content. The influence strength of the effect of Ba, Sr and Ca on the excitation emission wavelength in the direction of long wave was Ca>Sr>Ba.

The excitation emission wavelength moved more remarkably in the direction of long wave, with the increase of the ratio of a to b (a>b).

FIGS. 7, 8, 9 and 10 show the excitation emission spectra of the phosphor of Examples 26, 28, 31 and 32, respectively. The emission spectrum of FIG. 9 was obtained using the radiation light source of 470 nm as testing wavelength. It can be seen by analyzing the spectrum diagrams that the phosphor having yellow luminescence color according to the present invention had effective excitation in the excitation spectrum range from long wave UV to blue-green light spectrum region, especially having higher excitation intensity in blue light spectrum region. The phosphor according to the present invention can be suitable for preparing LED using ultraviolet chip or purple light chip as light-emitting element of radiation light source, and particularly suitable for preparing white light LED using blue light chip as light-emitting element of radiation light source. In white light LED, the phosphor according to the present invention was used to absorb part of emission of blue light radiation source and being excited; moreover, the emitted and remaining blue radiations were blended into white light. Such white light LED had good luminous efficiency and color index.

EXAMPLE 33

| Raw material | Weight(g) |
|---|---|
| $SrCO_3$ | 295.26 |
| $BaCO_3$ | 15.78 |
| $CaCO_3$ | 3 |
| $MgO$ | 34.26 |
| $SiO_2$ | 60.09 |
| $Eu_2O_3$ | 10.56 |
| $NH_4Cl$ | 16.05 |

The raw materials of the above composition were ball-milled and mixed homogenously, then placed in a crucible and put into an electric furnace, subsequently sintered in oxidizing atmosphere at 1100° C. for 3 hours, after cooling, the sintered product was sintered in a furnace through which a mixture gas consisting of nitrogen and hydrogen at a ratio of 95:5 was passed, and kept at 1250° C. for 5 hours for sintering. After the sintered product was cooled, it was pulverized, and ground by ball-milling, and then the phosphor having a yellow-red luminescence color according to the present invention 2.0SrO.0.08BaO.0.03CaO.SiO$_2$:0.06Eu$^{2+}$.0.3Cl$^-$ was collected with a 325 mesh sieve. The material had an excitation spectrum in the range of 200-530 nm, with an excitation main peak position at 432 nm, and an emission spectrum in the range of 480-640 nm, with an emission main peak value at 558 nm.

EXAMPLES 34-40

The phosphor with yellow-red luminescence color of Examples 34-40 were prepared by the raw materials mixing method and sintering method as in Example 33, the phosphor had an excitation spectrum in the range of 200-530 nm (the excitation main peak value varied with composition in the range of 400-485 nm) and an emission spectrum in the range of 480-640 nm (the emission main peak value varied with composition in the range of 535-580 nm). The compositions of Examples 34-40 were listed in Table 6.

TABLE 6

| Example No. | Composition of Examples |
|---|---|
| 34 | 1.9SrO•0.06CaO•0.6MgO•SiO$_2$•0.4B$_2$O$_3$•0.003P$_2$O$_5$:0.08Eu$^{2+}$•0.02Mn$^{2+}$•0.004Dy$^{3+}$ |
| 35 | 2.3SrO•0.2BaO•0.26CaO•MgO•SiO$_2$:0.06Eu$^{2+}$•0.01Na$^+$•0.25F$^-$ |
| 36 | 1.5SrO•0.5BaO•0.1CaO•SiO$_2$:0.1Eu$^{2+}$•0.15F$^-$•0.08Cl0.05Li$^+$•0.005K$^+$ |
| 37 | 1.9SrO•0.08BaO•0.2CaO•0.6MgO•SiO$_2$:0.06Eu$^{2+}$•0.2Cl$^-$ |
| 38 | 1.6SrO•0.4BaO•0.06CaO•0.1MgO•SiO$_2$:0.08Eu$^{2+}$•0.5F$^-$•0.18Cl0.1Li$^+$ |
| 39 | 2.0SrO•0.3CaO•SiO$_2$:0.06Eu$^{2+}$•0.25Cl$^-$ |
| 40 | 2.24SrO•2.06CaO•0.7MgO•SiO$_2$•0.4B$_2$O$_3$•0.03P$_2$O$_5$:0.08Eu$^{2+}$•0.05Li$^+$•0.005K$^+$•0.001Na$^+$•0.05F$^-$•0.002Br$^-$ |

For the composition of the phosphor having yellow-red luminescence color according to the invention, the law for the effect of the composition variation on the change of emission wavelength was:

When $2<(a+b)\leqq 5$, and $a>b$, the excitation emission wave length was affected by the ratio of Ba, Sr and Ca content. The excitation emission wavelength moved in the direction of short wave with the increase of Ba content; the excitation emission wave length moved in the direction of long wave with the increase of Sr content; and the excitation emission wave length moved in the direction of long wave with the increase of Ca content. The influencing strength of the effect of Ba, Sr and Ca on the excitation emission wave length in the direction of long wave was Ca>Sr>Ba.

Figure 11:
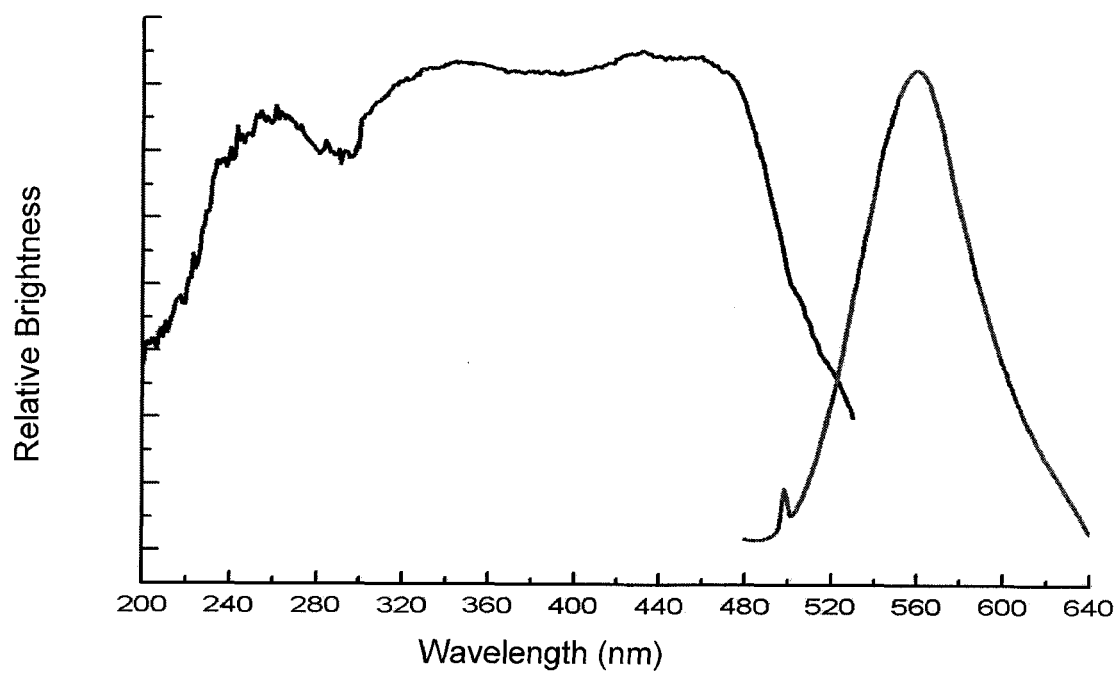
FIG. 11 the excitation and emission spectra of the phosphor of Example 33 having yellow-red luminescence color.

FIG. 11 shows the excitation emission spectrum of the phosphor of Example 33. It can be seen by analyzing the spectrum diagram that the phosphor having yellow-red luminescence color according to the present invention had effective excitation in the excitation spectrum range from long wave UV to green light spectrum region, especially having higher excitation intensity in 360-480 nm wave length range and being substantially parallel to abscissa axis. The phosphor according to the present invention are useful for preparing LED using ultraviolet chip or purple light chip as light-emitting element of radiation light source, and particularly suitable for preparing white light LED using blue light chip as light-emitting element of radiation light source. In white light LED, the phosphor according to the present invention was used to absorb part of the emission of blue light radiation source and be excited; moreover, the emitted and remaining blue radiations were blended into white light. Since the main peak of emission of the phosphor was located between the yellow spectrum region and red spectrum region, the white light LED manufactured had good color index and low color temperature.

EXAMPLE 41

| Raw material | Weight(g) |
|---|---|
| SrCO$_3$ | 36.91 |
| BaCO$_3$ | 246.64 |
| MgO | 60.47 |
| SiO$_2$ | 60.09 |
| Eu$_2$O$_3$ | 4.4 |
| Mn$_3$O$_4$ | 7.62 |
| NH$_4$Cl | 26.75 |

The raw materials of the above composition were ball-milled and mixed homogenously, then placed in a crucible and put into an electric furnace, subsequently sintered in oxidizing atmosphere at 1000° C. for 6 hours, after cooling, the sintered product was sintered in a furnace through which a mixture gas consisting of nitrogen and hydrogen at a volume ratio of 95:5 was passed, and kept at 1300° C. for 5 hours for sintering. After the sintered product was cooled, it was pulverized, and ground by ball-milling, and then the phosphor having a red luminescence color according to the present invention 0.25SrO.1.25BaO.1.5MgO.SiO$_2$:0.025Eu$^{2+}$.0.1Mn$^{2+}$.0.5Cl$^-$ was collected with a 325 mesh sieve. The material had an excitation spectrum in the range of 230-500 nm, with an excitation main peak value at 429 nm; the emission spectrum had two emission main peaks in red light region and blue light region, the emission spectrum in red light region was in the range of 480-640 nm, and the main peak value of red light emission was at 609 nm.

EXAMPLES 42-44

The phosphor with yellow-red luminescence color of Examples 42-44 were prepared by the method of mixing raw materials and sintering method as in Example 41, the phosphor had an excitation spectrum in the range of 200-530 nm (the excitation main peak value varied with composition in the range of 400-485 nm) and an emission spectrum in the range of 480-640 nm (the emission main peak value varied with composition in the range of 580-630 nm). The compositions of Examples 42-44 were listed in Table 7.

TABLE 7

| Example No. | Composition of Examples |
|---|---|
| 42 | $1.5BaO \cdot 2.0MgO \cdot SiO_2 \cdot 0.01B_2O_3 : 0.2Eu^{2+} \cdot 0.4Mn^{2+} \cdot 0.002Pr^{3+} \cdot 0.1Cl^-$ |
| 43 | $0.8BaO \cdot 0.5MgO \cdot SiO_2 \cdot 0.0011P_2O_5 : 0.06Eu^{2+} \cdot 0.03Mn^{2+} \cdot 0.25F^-$ |
| 44 | $0.9BaO \cdot 0.9MgO \cdot SiO_2 : 0.003Eu^{2+} \cdot 0.006Mn^{2+} \cdot 0.005F^-$ |

For the composition of the phosphor having red luminescence color according to the invention, the laws for the effect of the composition variation on the change of emission wavelength were:

Besides using the change of the content of alkaline earth metals to produce alkaline earth metal ion bonds different in nature so as to adjust the excitation and emission spectra of $Eu^{2+}$, the emission spectrum and energy were also controlled by effectively utilizing energy transfer between $Eu^{2+}$ and Ln ions (especially $Mn^{2+}$). When $Mn^{2+}$ amount is fixed, as $Eu^{2+}$ content increased, the intensity of red emission main peak of emission spectrum increased, but the intensity of the emission main peak in blue light region reduced; when $Eu^{2+}$ amount is fixed, as $Mn^{2+}$ content increased, the intensity of red emission main peak of emission spectrum reduced.

Figure 12:
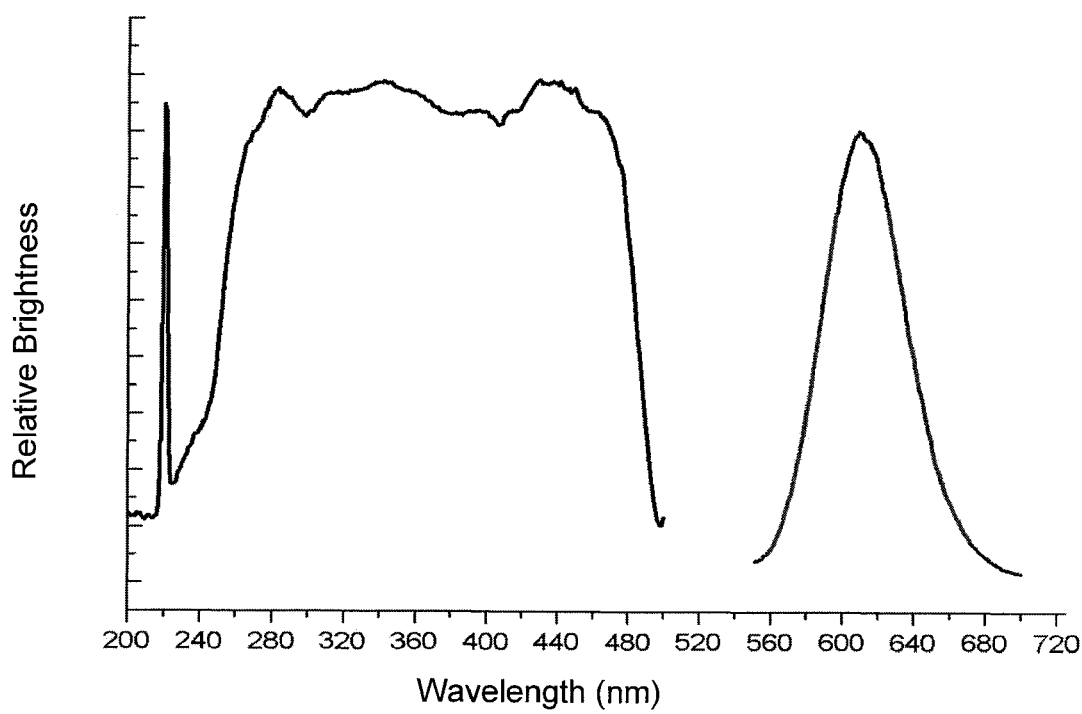
FIG. 12 the excitation and emission spectra of the phosphor of Example 41 having red luminescence color, the emission spectrum is an emission spectrum in red light region.

FIG. 12 shows the excitation emission spectrum of the phosphor of Example 41, the emission spectrum was an emission spectrum in red light region. It can be seen by analyzing the spectrum diagram that the phosphor having red luminescence color according to the present invention had effective excitation in the excitation light wave length range between 280 and 475 nm. In white light LED using ultraviolet chip or purple light chip or blue color chip as light-emitting element of radiation light source, its emission light in red light region improved color index, and reduced color temperature, and better matched with the sensitivity of human eyes.

The inventors discovered that the luminescence relative brightness and excitation emission spectrum of the materials could be improved to various extents by adding additives such as $NH_4Cl$, $NH_4F$, $(NH_4)_2HPO_4$, glucose, urea, $BaF_2$, $CaF_2$, and $ZnF_2$, $ZnS$, $SrS$, $CaS$, $SrSO_4$, $SrHPO_4$, or $CaHPO_4$, $Li_2CO_3$ and the like in an amount of 0-30% wt % based on the total weight of the raw materials, this will be explained by way of examples hereinafter.

Example 45

| Raw material | Weight(g) |
|---|---|
| $Sr(NO_3)_2$ | 253.96 |
| $Ca(OH)_2$ | 14.8 |
| $BaCO_3$ | 157.85 |
| $Mg(OH)_2 \cdot 4MgCO_3 \cdot 6H_2O$ | 10.07 |
| $H_4SiO_4$ | 96 |
| $H_3BO_3$ | 0.12 |
| $(NH_4)_2HPO_4$ | 2.64 |
| $Eu(NO_3)_3$ | 16.9 |
| $MnO_2$ | 0.87 |
| $CeO_2$ | 8.6 |
| $NH_4Cl$ | 2.68 |
| $ZnS$ | 0.49 |

With the addition of 14% $BaF_2$ and 0.3% $Li_2CO_3$ based on the total weight the raw materials, the raw materials of the above composition were ball-milled and mixed homogenously, then placed in a crucible and put into an electric furnace, subsequently sintered in oxidizing atmosphere at 700° C. for 6 hours, after cooling, the sintered product was sintered in a furnace through which a mixture gas consisting of nitrogen, hydrogen and hydrogen sulfide at a volume ratio of 95:3:2 was passed, and kept at 1150° C. for 5 hours for sintering. After the sintered product was cooled, it was pulverized, and ground by ball-milling, and then the phosphor having yellow luminescence color according to the present invention $1.2SrO \cdot 0.8BaO \cdot 0.2CaO \cdot 0.1MgO \cdot SiO_2 \cdot 0.001B_2O_3 \cdot 0.01P_2O_5 : 0.05Eu^{2+} \cdot 0.01Mn^{2+} \cdot 0.05Ce^{3+} \cdot 0.05Cl^- \cdot 0.005S^{2-} \cdot 0.45F^- \cdot 0.05Li^+$ was collected with a 325 mesh sieve. The excitation spectrum of the material was within the range of 240-520 nm, with an excitation main peak value at 436 nm (there was a strong excitation spectrum between 430 and 475 nm); the emission spectrum of the material was within the range of 450-630 nm, with the main peak value of emission at 537 nm.

In the manufacture process according to the invention, adding manner and method of various additional raw materials were similar to those in Example 45, only the kind and addition amount of the raw materials were selected based on the excitation emission spectrum range and relative brightness of the phosphor to be manufactured.

The present invention also relates to an lighting device using one or more of the phosphor according to the invention, particularly to semiconductor LED using a light-emitting element as radiation light source, the emission main peak of light-emitting element being within the range of 240-510 nm, especially LED emitting white light. The protection scope of the invention was explained by way of concrete examples hereinafter.

By reference to FIG. 13, the LED according to the present invention comprises semiconductor luminescent chip 1, a negative electrode 2, a positive electrode 3, a pin 4, phosphor 5, packaging material 6, a lead wire 7, and a reflector cup 8. The luminescent chip of the semiconductor is GaInN chip or GaN chip. The phosphor comprises at least one of the silicate phosphor according to the invention. The packaging material is transparent resin, and may be transparent epoxy resin, transparent silica gel, and the like.

FIG. 13a shows a manner that the phosphor directly contacts with the semiconductor luminescent chip, the phosphor being mixed with a transparent resin, and then applied uniformly onto the semiconductor luminescent chip, within the reflector cup. FIG. 13b shows a manner that the phosphor indirectly contacts with the semiconductor luminescent chip, the phosphor being distributed uniformly on the surface layer of epoxy resin. FIG. 13c shows a manner that the phosphor indirectly contacts with the semiconductor luminescent chip, the phosphor being distributed uniformly in the epoxy resin and on the semiconductor luminescent chip.

EXAMPLE 46

White light LED was manufactured using LED packaging manner as shown in FIG. 13a. The concrete packaging process was: the chip having matching wave length of the main peak of emission was selected based on effective excitation wave length range of the fluorescent powder. In this Example, the wave length of the main peak of emission of the semiconductor luminescent chip was 460 nm, the phosphor are selected as the phosphor in Example 33. The selected chip was subjected to crystalline fixation, lining, and drying. Several grams of the fluorescent powder was weighted and mixed with transparent epoxy resin at an appropriate ratio homogenously, and applied uniformly onto the semiconductor chip (gluing). The gluinged lead wire cup was placed into a vacuum oven and solidified, inserted into a mould filled with epoxy resin, solidified in the vacuum oven, and demoulded. The relative spectrum power distribution of this white light LED was shown in FIG. 14, its color coordinates were X=0.3191, Y=0.3292, the color temperature was 6160K, and color index was 85. The emission spectrum of the white light LED was formed by blending yellow-red luminescent spectrum of the fluorescent powder emitted by excitation of part of the blue light emitted from blue light chip and the remaining part of the blue light spectrum emitted from the blue light chip.

EXAMPLE 47

Figure 15:
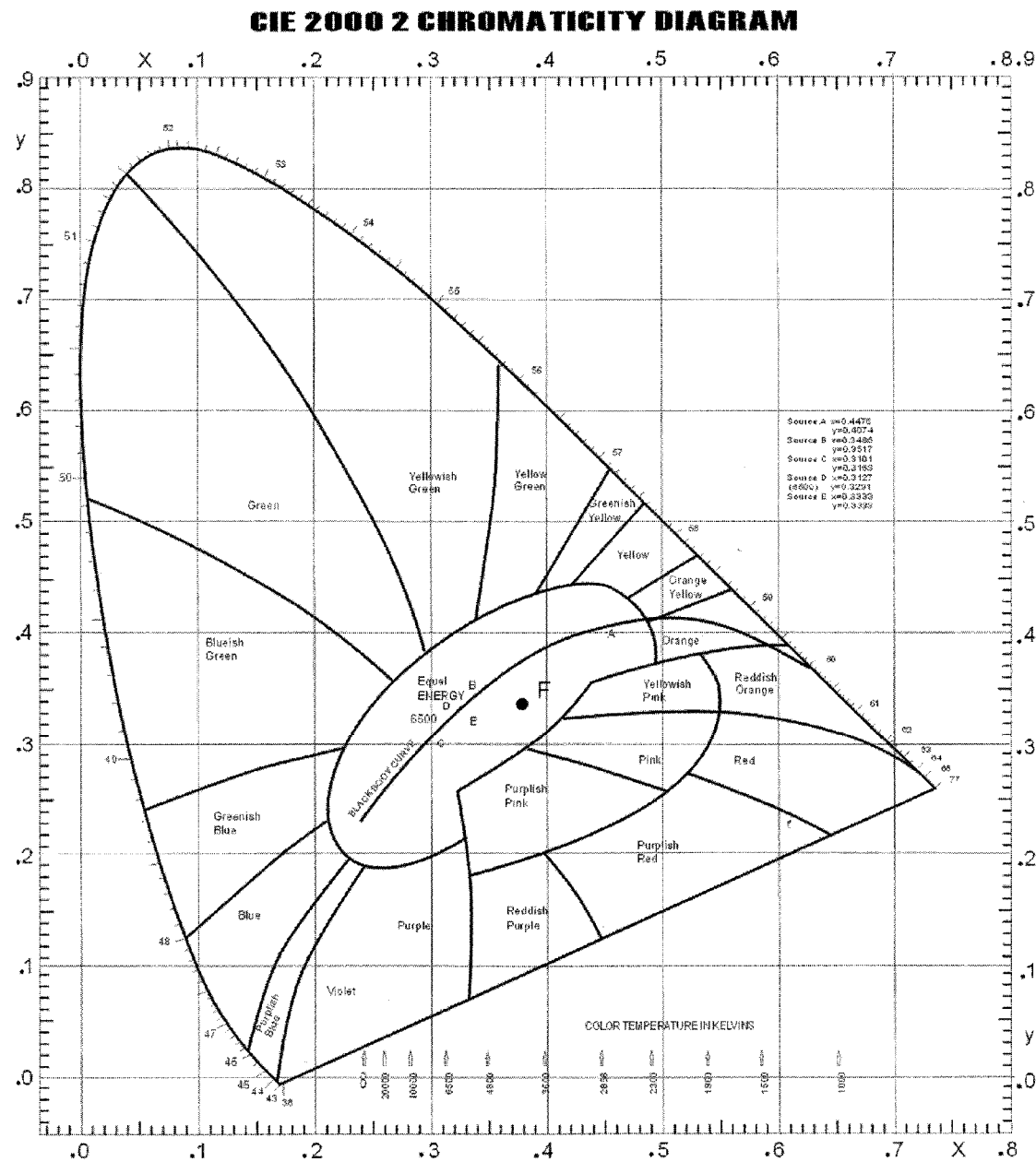
FIG. 15 the chromaticity coordinate of white light LED of Example 47 in CIE scale.

White light LED was manufactured using LED packaging manner as shown in FIG. 13b. In this Example, the wave length of the main peak of emission of the semiconductor luminescent chip was 385 nm, the phosphor comprised the phosphor in Examples 1, 13, 26 and 41 which were mixed in an appropriate ratio. The packaging process was similar to that described in Example 46, but the phosphor were distributed uniformly on the surface layer of epoxy resin. The emission spectrum of the white light LED was formed by blending the blue color, green color, yellow color, and red color luminescent spectra emitted respectively by above four fluorescent powder excited by part of the ultraviolet light emitted from ultraviolet light chip and/or part of the emission light from the phosphor and the remaining part of the emission light spectrum of the fluorescent powder. Its color coordinates were X=0.3747, Y=0.3403, and the color temperature was 3874K. FIG. 15 was CIE diagram of this white light LED. Wherein the point F was color coordinate point of white light LED in the example.

EXAMPLE 48

White light LED was manufactured using LED packaging manner as shown in FIG. 13c. In this Example, the wave length of the main peak of emission of the semiconductor luminescent chip was 470 nm, the phosphor comprised a mixture of the phosphor in Example 34 (with 556 nm wave length of emission main peak) and YAG fluorescent powder of garnet structure activated by doping rare-earth elements (($Y_{0.33}Gd_{0.63}Ce_{0.04})_3Al_5O_{12}$, the wave length of the emission main peak was 532 nm) and the fluorescent powder of sulfides activated by doping rare-earth elements (CaS:Eu, the wave length of the emission main peak was 606 nm) in an appropriate ratio. The packaging process was similar to that described in Example 46, but the phosphors were distributed uniformly in the epoxy resin, and on the semiconductor luminescent chip. The emission spectrum of the white light LED was formed by blending the yellow color, yellow-red color, and red color luminescent spectra emitted respectively by above three fluorescent powder excited by part of the blue light emitted from blue light chip and/or partial emission light from the phosphor and the remaining part of the emission light spectrum of the phosphor. Its color coordinates were X=0.3288, Y=0.3525, color temperature was 5637K, and color index was 80.

LED can be produced by using the LED packaging manners as shown in FIGS. 13a, 13b and 13c. The packaging process was similar to that in Examples 46, 47 and 48. However, the phosphor can be combined by a plurality of manners. The principles are:

(1) The effective excitation wavelength range of the fluorescent powder matches the emission main peak wave length of the semiconductor chip and/or the emission main peak wave length of other fluorescent powder used together.
(2) Under the precondition that the emission main peak wavelength of the semiconductor chip was determined, the phosphors are selected based on the required luminescent color of LED products.
(3) Under the precondition that at least one of the silicate phosphor according to the invention were used, the second phosphor and/or the third phosphor and/or fourth phosphor not according to the invention were selected based on the required luminescent color of LED products.

The phosphor capable of being used as the second phosphor and/or the third phosphor and/or fourth phosphor comprise: oxynitride phosphors activated by doping rare earth elements, and/or nitride phosphors activated by doping rare earth elements, and/or halosilicate phosphors activated by doping rare earth elements, and/or garnet structure phosphors activated by doping rare earth elements, and/or sulfide phosphors activated by doping rare earth elements, and/or oxide phosphors activated by doping rare earth elements, and/or sulfide-oxide phosphors activated by doping rare earth elements, and/or aluminate phosphors activated by doping rare earth elements, and/or magnesium fluoroarsenate (germanate) phosphors activated by doping Mn, and/or borate phosphors activated by doping rare earth elements, and/or phosphate phosphors activated by doping rare earth elements, and/or halophosphate phosphors activated by doping rare earth elements, and/or titantate phosphors activated by doping rare earth elements, and/or thiogallate phosphors activated by doping rare earth elements.

The luminescent color of the produced LED was determined by the emission spectrum and relative brightness of the semiconductor chip used and the emission spectrum and relative brightness of the fluorescent powder used.

The Examples 49-57 illustrated the selection of concrete chips and fluorescent powder and LED luminescent color, and the results were listed in Table 8.

TABLE 8

| | | | Combination manner of fluorescent powder | | | |
|---|---|---|---|---|---|---|
| Example No. | Kind of chip | Wave length of the emission main peak of the chip (nm) | Wave length of emission main peak of the phosphor according to the invention (nm) | Composition of other phosphor | Wave length of emission main peak of other phosphor (nm) | LED luminescent color |
| 49 | GaInN | 450 | 500 | $(Y_{0.29}Tb_{0.67}Ce_{0.04})_3Al_5O_{12}$<br>$Ca_8Mg(SiO_4)_4Cl_2$:Eu, Mn | 570<br>507 | white |

TABLE 8-continued

| Example No. | Kind of chip | Wave length of the emission main peak of the chip (nm) | Wave length of emission main peak of the phosphor according to the invention (nm) | Composition of other phosphor | Wave length of emission main peak of other phosphor (nm) | LED luminescent color |
|---|---|---|---|---|---|---|
| 50 | GaN | 430 | 480 | $(Y_{0.79}Tb_{0.17}Ce_{0.04})_3Al_5O_{12}$ | 555 | white |
| 51 | GaInN | 455 | 490 | $SrSi_2O_2N_2$:Eu | 560 | white |
|    |       |     | 523 |                   |     |       |
|    |       |     | 605 |                   |     |       |
| 52 | GaInN | 462 | 508 | $Ca_2Si_5N_8$:Eu | 620 | white |
|    |       |     | 533 |                  |     |       |
| 53 | GaInN | 458 | 485 | $Ba_{0.9}Eu_{0.1}Al_{1.7}Si_{0.3}O_{3.7}N_{0.3}$ | 530 | white |
|    |       |     | 600 | $CaSi_2O_3N_2$:Eu | 570 |       |
| 54 | GaN | 485 | 560 |  |  | white |
|    |     |     | 620 |  |  |       |
| 55 | GaInN | 400 | 470 | $3.5MgO \cdot 0.5MgF_2 \cdot GeO_2:Mn^{4+}$ | 655 | white |
|    |       |     | 530 |  |  |       |
| 56 | GaInN | 460 | 510 | $(Y_{0.95}Ce_{0.05})_3Al_5O_{12}$ | 550 | white |
|    |       |     | 535 |  |  |       |
| 57 | GaInN | 410 | 570 |  |  | Yellow-red |

Figure 16:
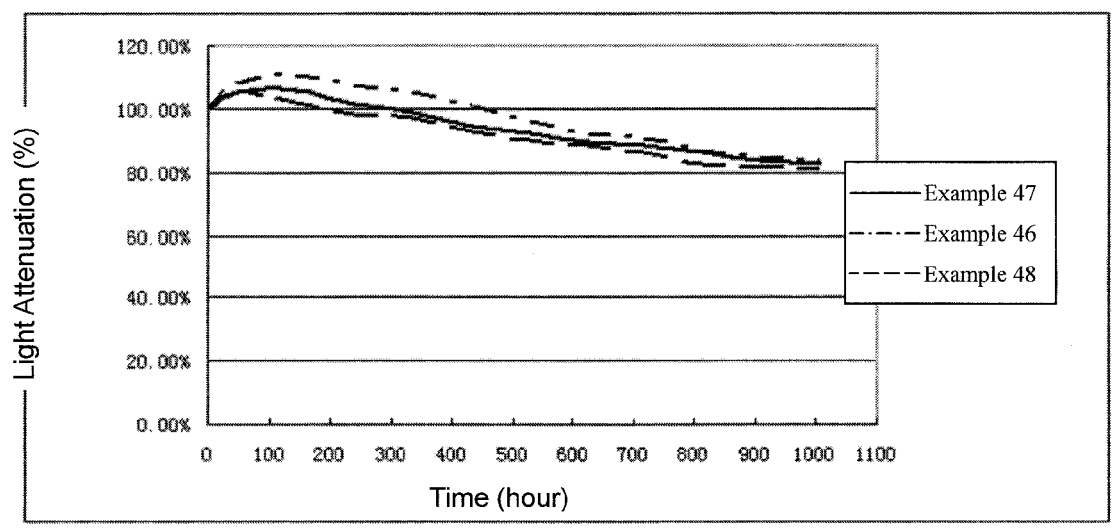
FIG. 16 is a curve diagram of the optical attenuation of white light LED of Examples 46, 47 and 48.

The silicate phosphors according to the invention are advantageous in attenuation resistance. Destructive aging test was carried out on the white light LED produced in Examples 46, 47 and 48. The test conditions were: environmental temperature 25° C., electric current 100 mA, aging time 1008 hours. The curve of brightness attenuation was shown in FIG. 16. It can be seen from the figure that, in the destructive test under the conditions, the optical attenuation of LED was less than 26%. The silicate phosphors according to the invention are advantageous in the attenuation resistance and have excellent temperature stability.

The invention claimed is:

1. A phosphor, particularly a phosphor used in a light-emitting device including LED, wherein it comprises silicate and activator ion, and its essential chemical composition is expressed by the formula:

$$aMO \cdot bM'O \cdot SiO_2 \cdot cR:xEu, yLn, zLv, \delta Lm,$$

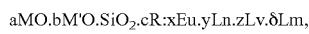

wherein
M is an element or a combination of elements selected from the group consisting of Sr, Ca, Ba and Zn;
M' is an element or a combination of elements selected from the group consisting of Mg, Cd and Be;
R is one or two of $B_2O_3$ and $P_2O_5$;
Ln is an element or a combination of elements selected from the group consisting of Nd, Dy, Ho, Tm, La, Ce, Er, Pr, Bi, Sm, Sn, Y, Lu, Ga, Sb, Tb, Mn and Pb;
Lv is an element or a combination of elements selected from the group consisting of Cl, F, Br, I and S;
Lm is an element or a combination of elements selected from the group consisting of Li, Na and K; and
a, b, c, x, y, z and $\delta$ are molar coefficients, wherein $0.5 \leq a \leq 5.0$, $0 \leq b \leq 3.0$, $0 < c \leq 0.5$, $0.001 \leq x \leq 0.2$, $0 < y \leq 0.5$, $0 < z < 0.5$; $0 < \delta < 0.2$, wherein $1 < (a+b) \leq 6$, and $(a+b) \neq 2$;
the material is capable of being excited by a light-emitting element as a radiation light source having an emission spectrum between 240 and 510 nm which is from ultraviolet to green light region, absorbing at least a portion of emission light of the radiation light source, and emitting an emission spectrum between 420-700 nm which has at least one peak emission wavelength in the range of about 430-630 nm, the luminescence color is blue, blue-green, green, yellow-green, yellow, yellow-red, red, or white.

2. The phosphor according to claim 1, wherein the ranges of said molar coefficients are:
(1) when $1 < (a+b) < 2$, and $a > b$, then $0.5 \leq a \leq 1.5$, $0.4 \leq b \leq 1.0$, and $M \neq Ca$; when $2 < (a+b) \leq 4$, then $1.0 \leq a \leq 2.0$, $1.0 \leq b \leq 2.0$; and the luminescence color is blue after excitation, and the wavelength of the emission main peak varies with composition in the range of 440-475 nm;
(2) when $1 < (a+b) < 2$, and $a > b$, then $0.5 \leq a \leq 1.5$, $0.4 \leq b \leq 1.0$, and the molar content ratio of Ca to Sr is between 0.2 and 0.5; when $2 < (a+b) \leq 4$, then $1.0 \leq a \leq 3.0$, $0.5 \leq b \leq 1.5$, and $M \neq Ba$; and the luminescence color is blue-green after excitation, the wavelength of emission main peak varies with composition in the range of 470-490 nm;
(3) when $1 < (a+b) < 2$, then $0.5 \leq a \leq 1.5$, $0.2 \leq b \leq 1.0$, and the molar content ratio of Ca to Sr is between 0.6 and 1.5; when $2 < (a+b) \leq 5$, then $0.5 \leq a \leq 3.0$, $0 \leq b \leq 3.0$, and the molar content of Ba is greater than the molar content of Sr and/or Ca; and the luminescence color is green after excitation, the wavelength of emission main peak varies with composition in the range of 490-510 nm;
(4) when $1 < (a+b) < 2$, then $0.5 \leq a \leq 1.5$, $0 \leq b \leq 1.0$, and the molar content ratio of Ca to Sr is between 2.8 and 3.3; when $2 < (a+b) \leq 6$ and $a \geq b$, then $1.5 \leq a \leq 3.0$, $0 \leq b \leq 3.0$; and the luminescence color is yellow-green after excitation, the wavelength of emission main peak varies with composition in the range of 505-525 nm;
(5) when $1 < (a+b) < 2$, then $0.5 \leq a \leq 1.5$, $0.4 \leq b \leq 1.0$, and $M \neq Sr$; when $2 < (a+b) \leq 6$ and $a \geq b$, then $2 \leq a \leq 4$, $0 \leq b \leq 3.0$; the luminescence color is yellow after excitation, the wavelength of emission main peak varies with composition in the range of 515-540 nm;
(6) when $2 < (a+b) \leq 5$ and $a > b$, then $1.0 \leq a \leq 4.0$, $0 \leq b \leq 1.5$, and when $b \neq 0$, then the ratio of a to b is greater than 2, when $b = 0$, then the molar content ratio of Sr and/or Ca to Ba is greater than 2; and the luminescence color is yellow-red after excitation, the wavelength of emission main peak varies with composition in the range of 535-580 nm; or
(7) when $1 < (a+b) < 1.5$, then $0.2 \leq a \leq 1.2$, $0.2 \leq b \leq 1.2$; when $1.5 < (a+b) < 2$, then $0.5 \leq a \leq 1.8$, $0 \leq b \leq 1.8$; when $2 < (a+b) \leq 5$, then $1.0 \leq a \leq 3.0$, $0 \leq b \leq 3$; and the luminescence color is red after excitation, the wavelength of emission main peak varies with composition in the range of 580-630 nm.

3. The phosphor according to claim 1, wherein the phosphor is excited by the light of radiation light source having a peak emission wavelength of 240-510 nm, and the wavelength of the emission peak of the phosphor is longer than the wavelength of long-wave side of emission peak of the radiation light source.

4. A light-emitting device comprising a light-emitting element as a radiation light source and a phosphor capable of converting at least a portion of light of radiation light source, wherein:
the radiation light source is configured to emit radiation having a peak wavelength ranging in the range of ultraviolet to green light region between 240 and 510 nm, and the phosphor allows at least a part of the wavelength of the first luminescent spectrum of said light-emitting element to be converted into a second emission spectrum having at least one peak in the range of 430 to 630 nm, wherein at least one of the phosphors are the phosphors according to any one of claims 1-3.

5. The light-emitting device according to claim 4, wherein the radiation light source is configured to emit radiation having a peak wavelength ranging in the range of ultraviolet light, and the phosphor absorbs at least a portion of emission light of radiation light source and/or other phosphor in the combination, converting at least a part of the wavelength of the luminescent spectrum of the light-emitting element into different emission spectra having at least one peak with a wavelength within the range between 430 and 630 nm, to obtain a mixed white light, or blue light, or blue-green light, or green light, or yellow-green light, or yellow light, or yellow-red light, or red light.

6. The light-emitting device according to claim 4, wherein a radiation light source is configured to emit radiation having a peak wavelength ranging in the range of blue to green light, the phosphor absorbs at least a portion of emission light of radiation light source and/or other phosphor in the combination, converting at least a part of the wave length of the luminescent spectrum of the light-emitting element into different emission spectra having at least one peak with a wavelength within the range between 430 and 630 nm, to obtain a mixed white light, or blue light, or blue-green light, or green light, or yellow-green light, or yellow light, or yellow-red light, or red light, after mixing with a portion of the light from the radiation light source.

7. The light-emitting device according to claim 4, the phosphor further comprises a second phosphor, and/or a third phosphor, and/or a fourth phosphor, which are used together with one or more of the phosphors according to claim 1; the second phosphor, and/or the third phosphor, and/or the fourth phosphor convert at least a portion of the wavelength of the light from radiation light source, and/or at least a portion of the wavelength of the light from the phosphor according to claim 1, and emit light having at least one peak emission wavelength ranging in the visible light region from blue light to red light.

8. The light-emitting device according to claim 4, wherein a radiation light source is configured to emit radiation having a peak wavelength ranging in the range of ultraviolet light, at least two kinds of the light, including at least a portion of light from the silicate phosphor according to claim 1, and the light from the second phosphor and/or the third phosphor and/or the fourth phosphor, are mixed to obtain a white light, or blue light, or blue-green light, or green light, or yellow-green light, or yellow light, or yellow-red light, or red light.

9. The light-emitting device according to claim 4, wherein a radiation light source is configured to emit radiation having a peak wavelength ranging in the range from blue light to green light, at least two kinds of light, including at least a portion of light from the radiation light source, at least a portion of light from the silicate phosphor according to claim 1 and the light from the second phosphor and/or the third phosphor and/or the fourth phosphor, are mixed to obtain a white light, or blue light, or blue-green light, or green light, or yellow-green light, or yellow light, or yellow-red light, or red light.

10. The light-emitting device according to claim 4, wherein the second phosphor and/or the third phosphor and/or the fourth phosphor are: oxynitride phosphor activated by doping rare earth elements, and/or nitride phosphor activated by doping rare earth elements, and/or halosilicate phosphor activated by doping rare earth elements, and/or garnet structure phosphor activated by doping rare earth elements, and/or sulfide phosphor activated by doping rare earth elements, and/or oxide phosphor activated by doping rare earth elements, and/or sulfide-oxide phosphor activated by doping rare earth elements, and/or aluminate phosphor activated by doping rare earth elements, and/or magnesium fluoroarsenate (germanate) phosphor activated by doping Mn, and/or borate phosphor activated by doping rare earth elements, and/or phosphate phosphor activated by doping rare earth elements, and/or halophosphate phosphor activated by doping rare earth elements, and/or titanate phosphor activated by doping rare earth elements, and/or thiogallate phosphor activated by doping rare earth elements.

11. The light-emitting device according to claim 4, wherein the light-emitting device is a luminescent conversion LED in which the phosphor directly or indirectly contacts with a chip, wherein said phosphor at least contains one or two or more kinds of silicate phosphor according to claim 1.

12. The light-emitting device according to claim 4, wherein the light-emitting device is a lighting device comprising at least one LED using said silicate phosphor according to claim 1.

* * * * *